(12) United States Patent
Friedmann et al.

(10) Patent No.: US 6,196,925 B1
(45) Date of Patent: *Mar. 6, 2001

(54) APPARATUS FOR DAMPING VIBRATIONS

(75) Inventors: Oswald Friedmann, Lichtenau; Johann Jäckel, Bühl, both of (DE)

(73) Assignee: LuK Lamellen und Kupplaungsbau GmbH, Buhl/Baden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/193,897

(22) Filed: Nov. 18, 1998

Related U.S. Application Data

(62) Division of application No. 08/904,975, filed on Aug. 1, 1997, now Pat. No. 5,860,863, which is a division of application No. 08/541,489, filed on Oct. 10, 1995, now Pat. No. 5,873,785, which is a division of application No. 08/320,732, filed on Oct. 19, 1994, now abandoned, which is a division of application No. 08/060,490, filed on May 7, 1993, now Pat. No. 5,487,704, which is a continuation of application No. 07/626,384, filed on Dec. 12, 1990, now abandoned, which is a continuation of application No. 07/434,524, filed on Nov. 7, 1989, now abandoned, which is a continuation of application No. 07/063,301, filed on Jun. 17, 1987, now abandoned.

(30) Foreign Application Priority Data

| Jul. 5, 1986 | (DE) | 36 22 697 |
|---|---|---|
| Oct. 4, 1986 | (DE) | 36 33 870 |
| Dec. 13, 1986 | (DE) | 36 42 679 |

(51) Int. Cl.$^7$ ............................................. F16D 3/12
(52) U.S. Cl. ............................................. 464/68
(58) Field of Search ................... 464/66, 67, 68, 464/64, 24; 192/213.1, 70.1, 30 V; 74/574

(56) References Cited

U.S. PATENT DOCUMENTS

| 4,662,239 | * | 5/1987 | Worner et al. | 464/68 |
| 4,751,992 | * | 6/1988 | Maucher et al. | 192/70.17 |
| 5,059,156 | * | 10/1991 | Worner et al. | 464/68 |
| 5,273,372 | * | 12/1993 | Friedmann et al. | 464/24 |
| 5,382,193 | * | 1/1995 | Friedmann et al. | 464/64 |
| 5,487,704 | * | 1/1996 | Friedmann et al. | 464/24 |
| 5,622,087 | * | 4/1997 | Schierling et al. | 464/68 |
| 5,863,252 | * | 1/1999 | Friedmann et al. | 464/24 |
| 5,873,785 | * | 2/1999 | Friedmann et al. | 464/68 |

* cited by examiner

Primary Examiner—Lynne H. Browne
Assistant Examiner—Greg Binda
(74) Attorney, Agent, or Firm—Darby & Darby

(57) ABSTRACT

An apparatus for damping torsional vibrations between the engine and the power train in a motor vehicle has flywheels which are rotatable relative to each other. One flywheel is mounted on the output element of the engine and another flywheel is connectable to the power train by a friction clutch. Installed between the flywheels are at least two resilient dampers operating in parallel. In a first stage of relative rotation between the flywheels from a starting position, only one of the dampers is active to oppose the rotation. In a next-following second stage of relative rotation the other of the two dampers becomes active to oppose the rotation in parallel with the first damper.

10 Claims, 16 Drawing Sheets

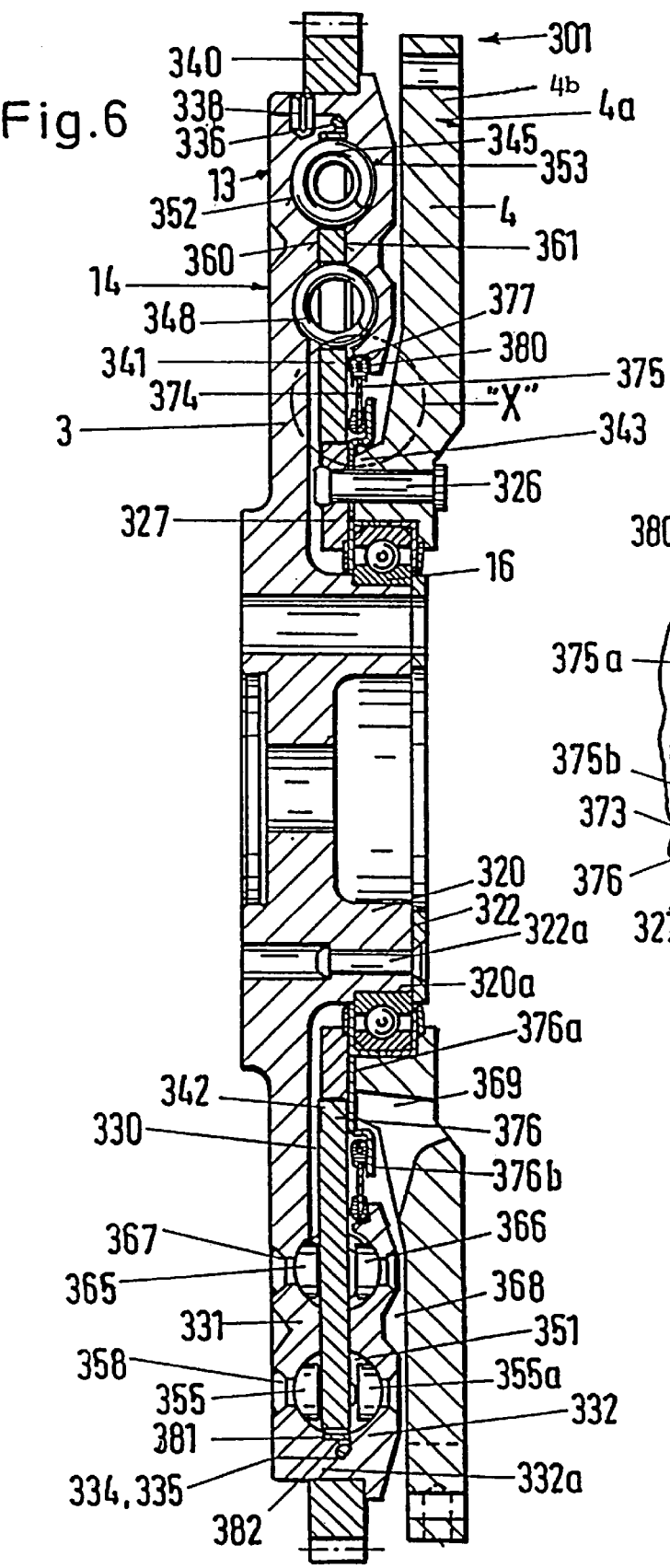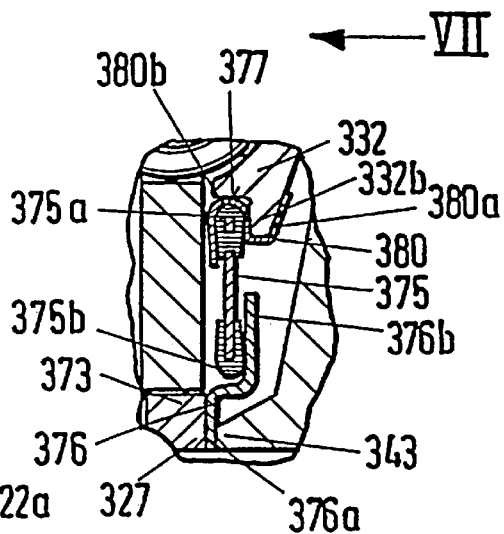

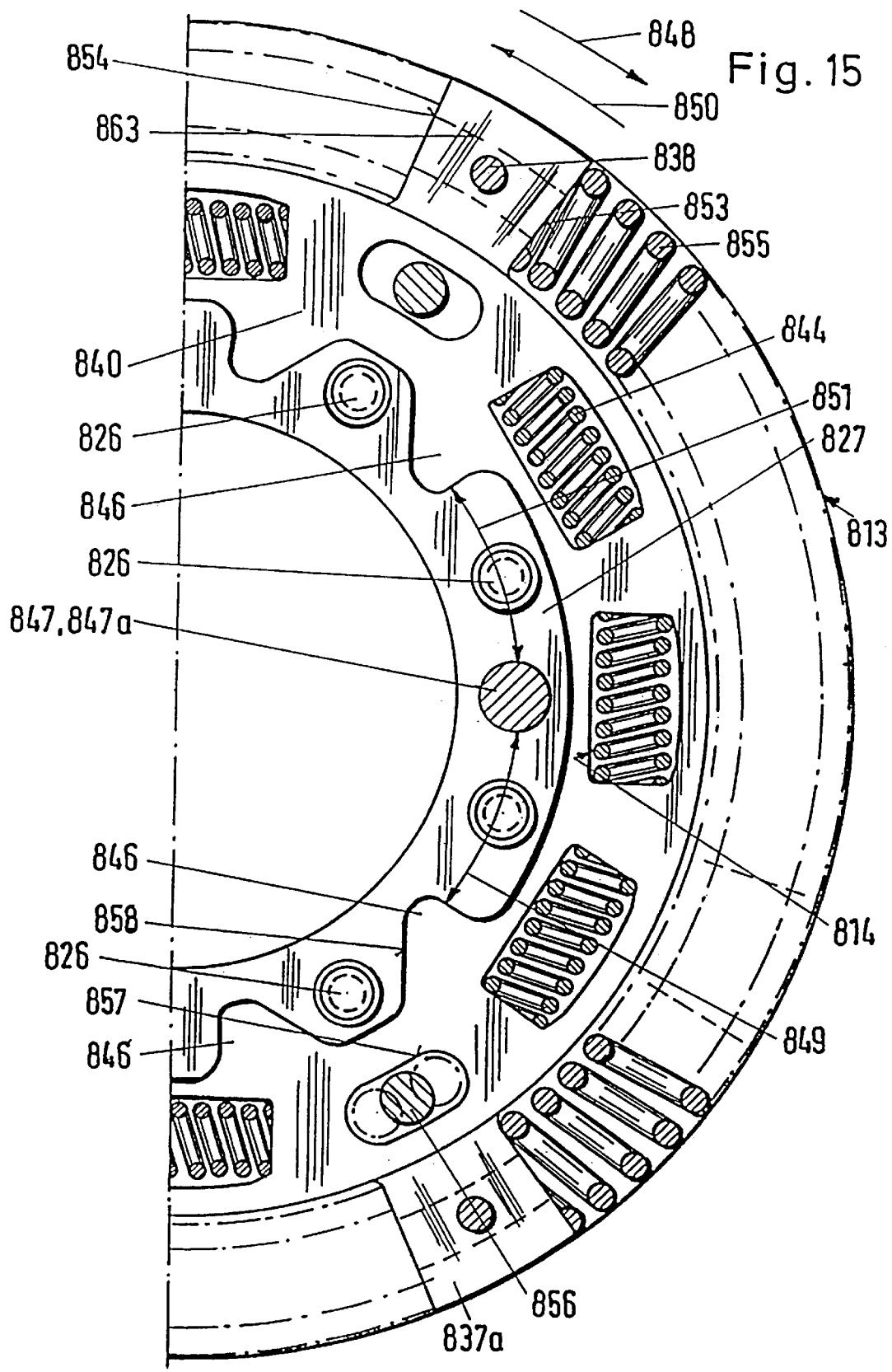

APPARATUS FOR DAMPING VIBRATIONS

CROSS-REFERENCE TO RELATED CASES

This application is a division of Ser. No. 08/904,975 filed Aug. 1, 1997, now U.S. Pat. No. 5,860,863, which is a division of Ser. No. 08/541,489 filed Oct. 10, 1995, now U.S. Pat. No. 5,873,785, which is a division of Ser. No. 08/320,732 filed Oct. 7, 1994, now abandoned, which is a division of Ser. No. 08/060,490 filed May 7, 1993, now U.S. Pat. No. 5,487,704, which is a continuation of Ser. No. 07/626,384, now abandoned, which is a continuation of Ser. No. 07/434,524 filed Nov. 7, 1989, now abandoned, which is a continuation of Ser. No. 07/063,301 filed Jun. 17, 1987, now abandoned. All of the above-enumerated prior applications and all three German priority documents are herewith incorporated in this Rule 1.53(b) application by reference.

BACKGROUND OF THE INVENTION

The invention relates to apparatus for damping vibrations, especially torsional vibrations between the output element (e.g., a crankshaft) of an engine and the power train in a motor vehicle. More particularly, the invention relates to improvements in apparatus of the type having at least two flywheels which are rotatable relative to each other against the opposition of damper means wherein one flywheel is the input member and the other flywheel is the output member of the damper means. The output member can be coupled to the power train by a clutch, particularly a friction clutch.

Heretofore known vibration damping apparatus of the above outlined type employ dampers which have energy storing elements acting in the circumferential direction of the flywheels and normally including coil springs which store elastic energy, and additional energy storing elements which act in the axial direction of the flywheels and cooperate with friction pads and/or linings to produce friction (i.e., hysteresis). The means for generating friction operate in parallel with energy storing means which act in the circumferential direction of the flywheels.

It has been found that certain conventional vibration damping apparatus can operate satisfactorily (i.e., they are capable of damping torsional vibrations as well as noise) but only under specific circumstances. Thus, the mode of operation of such conventional apparatus is not entirely satisfactory under many operating conditions because their design is a compromise due to an attempt to ensure satisfactory or acceptable operation under a variety of different conditions. For example, a purely mechanical solution does not suffice to cover a wide spectrum of operating conditions entailing the development of many basically different stray movements and noise levels. Moreover, purely mechanical solutions are quite expensive, especially if they are to adequately suppress stray movements and noise under a variety of different operating conditions. This is due to the fact that, if a mechanically operated vibration damping apparatus is to counteract a wide range of amplitudes of undesirable stray movements of the flywheels relative to each other, such undertaking greatly increases the cost, bulk, complexity and sensitivity of the apparatus. Moreover, even a very complex and expensive mechanical vibration damping apparatus is incapable of operating satisfactorily under any one of a wide range of different operating conditions because the individual damper stages (i.e., hystereses produced by individual energy storing elements which act in the circumferential direction of the flywheels) cannot be altered as a function of changes in operating conditions. Still further, presently known apparatus are subject to extensive wear so that their useful life is relatively short, and they are also prone to malfunction.

OBJECTS AND SUMMARY OF THE INVENTION

An object of the invention is to provide a vibration and noise damping apparatus whose versatility exceeds that of heretofore known apparatus and which can be used in a wide variety of systems for transmission of torque, especially between the engines and power trains of motor vehicles.

Another object of the invention is to provide an apparatus whose damping characteristics (i.e., the rate of energy dissipation) can conform to the vibration and/or noise generating behavior of motor vehicles under a wide variety of different operating conditions and/or other influences.

A further object of the invention is to provide an apparatus which can be used to connect existing engines or other prime movers with existing power trains.

An additional object of the invention is to provide an apparatus which operates properly at low or high rotational speeds as well as at resonance RPM and during starting or stoppage of the engine in a motor vehicle.

Still another object of the invention is to provide an apparatus which can properly prevent transmission of undesirable stray movements between an engine and a power train under a variety of apparently contradictory or conflicting circumstances without affecting the quality, reliability and/or reproducibility of the vibration- and/or noise-suppressing action.

Another object of the invention is to provide a relatively simple, compact and inexpensive apparatus which can be readily assembled or taken apart and whose useful life is eminently satisfactory for utilization between the engines and power trains of motor vehicles of all or nearly all kinds.

An additional object of the invention is to provide an apparatus which comprises a relatively small number of relatively simple and inexpensive parts and wherein the percentage of components which need not undergo secondary treatment in material removing tools and the like is higher than in heretofore known apparatus.

A further object of the invention is to provide an apparatus wherein the wear upon the parts which move relative to each other is not pronounced and whose utilization entails minimal losses in the driving system.

Another object of the invention is to provide novel and improved flywheels for use in the above outlined apparatus.

A further object of the invention is to provide a novel and improved method of broadening the range of utility of apparatus for counteracting vibrations and the transmission of noise between the engines and power trains of motor vehicles.

An additional object of the invention is to provide a motor vehicle which embodies the above outlined apparatus.

A further object of the invention is to provide the apparatus with novel and improved means for suppressing stray movements of several flywheels which are rotatable relative to each other and serve to transmit torque between a prime mover and a transmission or the like.

Still another object of the invention is to provide the apparatus with novel and improved means for damping stray movements of several flywheels with reference to each other.

A further object of the invention is to provide an apparatus which can generate a variety of damping actions, either simultaneously or during selected stages of transmission of torque between a prime mover and a power train or the like.

An additional object of the invention is to provide an apparatus wherein a highly satisfactory damping action can be generated by the medium which is used to prolong the useful life of moving parts.

A further object of the invention is to provide the apparatus with novel and improved means for transmitting torque between its components in such a way that the components can be readily separated, reassembled and inspected in a time-saving operation.

Another object of the invention is to provide the apparatus with novel and improved means for varying the vibration- and/or noise-damping action in automatic response to changes in operating conditions.

The invention is embodied in an apparatus for damping vibrations, especially between an engine and a power train. The apparatus comprises a composite flywheel including a first flywheel which is connectable with the engine (e.g., with a crankshaft which is driven by the engine) and a second flywheel which is connectable with the power train (e.g., by way of a friction clutch which is installed between the second flywheel and the input shaft of a change-speed transmission of the power train). The flywheels are rotatable relative to each other against the opposition of damper means which operates between the flywheels, the first flywheel constituting the input member and the second flywheel constituting the output member of the damper means. One of the first and second flywheels includes or carries a housing which defines at least one annular compartment having a substantially closed (e.g., substantially circular) cross-sectional outline. The damper means includes at least one damper having a plurality of deformable energy storing elements (such as coil springs) which are installed in the compartment, and the housing preferably closely conforms to the outlines of the energy storing elements (i.e., the energy storing elements of the one damper are snugly received in the compartment). The one damper further comprises means for deforming the energy storing elements in the compartment, and such deforming means includes first abutment means provided on the housing and located in the compartment and a deforming member (hereinafter called flange for short) which is rotatable with the other of the first and second flywheels and has second abutment means in the compartment. Still further, the damper means comprises a supply of viscous fluid medium (such as a paste) which at least partially fills the compartment.

The flange and the housing can define a narrow gap which communicates with the compartment, and the second abutment means preferably extends substantially radially of the one flywheel. The second abutment means can include radially outwardly extending arms which are integral parts of the flange and form an annulus in a plane making an angle of 90 degrees with the axes of the flywheels. At least one of the arms can include an extension which is disposed in the compartment radially outwardly of the adjacent energy storing element or elements and is preferably received in a portion of the compartment so that its inner side is adjacent the radially outermost portion or portions of the adjacent energy storing element(s).

The housing can include two substantially shell-shaped parts or sections and at least one of these sections can consist of a deformable (ductile) metallic sheet material which can be shaped in a press or a like machine. Each section can constitute a half shell.

The compartment is or can constitute a circumferentially complete annulus, and the first abutment means can constitute discrete stops in the compartment. Such stops can be riveted, welded or otherwise fixedly secured to the respective sections of the housing to alternate with the second abutment means (such as the aforementioned arms of the flange) in the neutral position of the one damper.

At least those portions of the abutment means which actually contact the energy storing elements can have a pronounced hardness. Such pronounced hardness can be achieved as a result of thermal treatment oi the aforementioned portions of the abutment means. Alternatively or in addition to such thermal treatment, selected portions of the abutment means and/or of the energy storing elements and/or of the sections of the housing can be provided with coatings of a material which exhibits a pronounced hardness.

The first abutment means can be integral with the housing; for example, such integral first abutment means can include pockets which are provided on one or both sections of the housing and extend into the compartment.

The apparatus can comprise separately produced means for reducing frictional engagement of the housing with the energy storing elements, and such means is preferably disposed radially outwardly of the energy storing elements in the compartment and can include at least one insert in the form of a strip or band of steel or the like. The insert or inserts are received in suitable recess(es) of the housing. For example, the entire frictional engagement reducing means can include a single steel band whose end portions are anchored in the housing and whose material exhibits a pronounced hardness.

The band can have a concave side which faces the energy storing elements in the compartment and extends along an arc of 45–120 degrees, preferably along an arc of 60–90 degrees in the circumferential direction of the normally circular cross-sectional outline of the compartment.

The apparatus can further comprise retainer means interposed between at least one of the abutment means and the energy storing elements, particularly between the energy storing elements and the second abutment means. Each retainer means can have an outline which closely conforms to that of the surfaces forming part of the housing and bounding the compartment. The energy storing elements are preferably springs (such as coil springs) having hollow end portions and at least one of the retainer means has an extension in the end portion of the adjacent spring such extension can have a substantially conical shape to be readily receivable in the end portion of the adjacent spring. The conicity of the extension can be such that it automatically reenters the end portion of the adjacent spring upon each separation of such end portion from the extension in response to subsequent movement of the end portion of the spring toward the extension and/or vice versa. Each retainer means can act not unlike a piston for the fluid medium in the compartment, and at least one of the retainer means can define a path for the flow of fluid medium therethrough (e.g., through an opening or hole or notch or recess in the retainer means) substantially in the circumferential direction of the flywheels.

The compartment can have a varying cross-sectional area in the region of at least one energy storing element to influence the flow restricting action of the housing in such region and hence the damping action of the damper as a result of different resistance to the flow of fluid medium.

The novel features which are considered as characteristic of the invention are set forth in particular in the appended claims. The improved apparatus itself, however, both as to its construction and its mode of operation, together with additional features and advantages thereof, will be best understood d upon perusal of the following detailed description of certain specific embodiments with reference to the accompanying drawing.

BRIEF DESCRIPTION OF THE DRAWING

FIG. 6 is an axial sectional view of a fourth apparatus with a different sealing device between the flywheels radially inwardly of the inner damper;

FIG. 6a is an enlarged view of the detail within the phantom-line circle "X" of FIG. 6;

FIG. 15 is a fragmentary sectional view as seen in the direction of arrows from the line XV—XV of FIG. 14;

DESCRIPTION OF THE PREFERRED EMBODIMENTS

Figure 1:
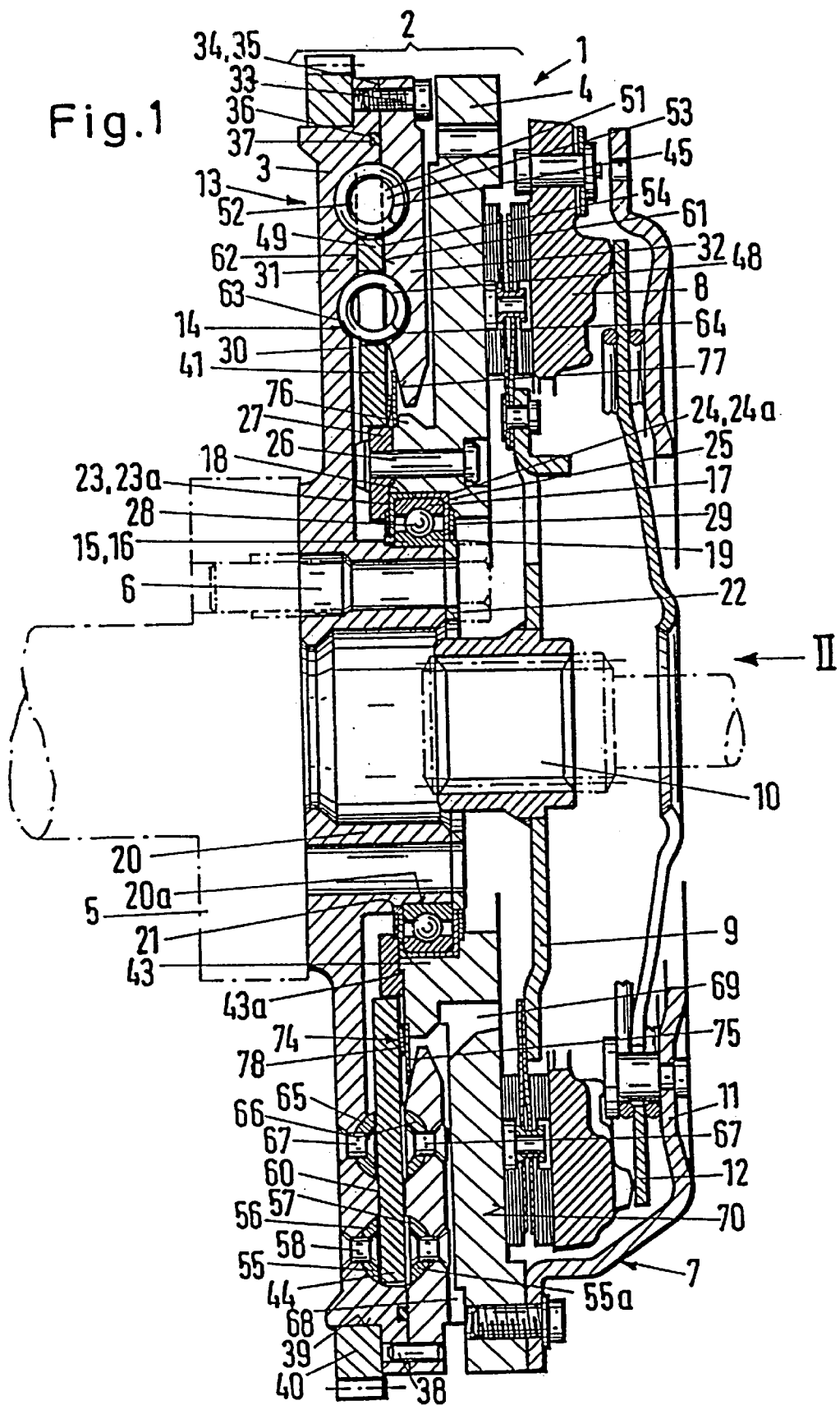
FIG. 1 is an axial sectional view of a vibration damping apparatus which embodies one form of the invention and wherein the damper means comprises two dampers.
Figure 2:
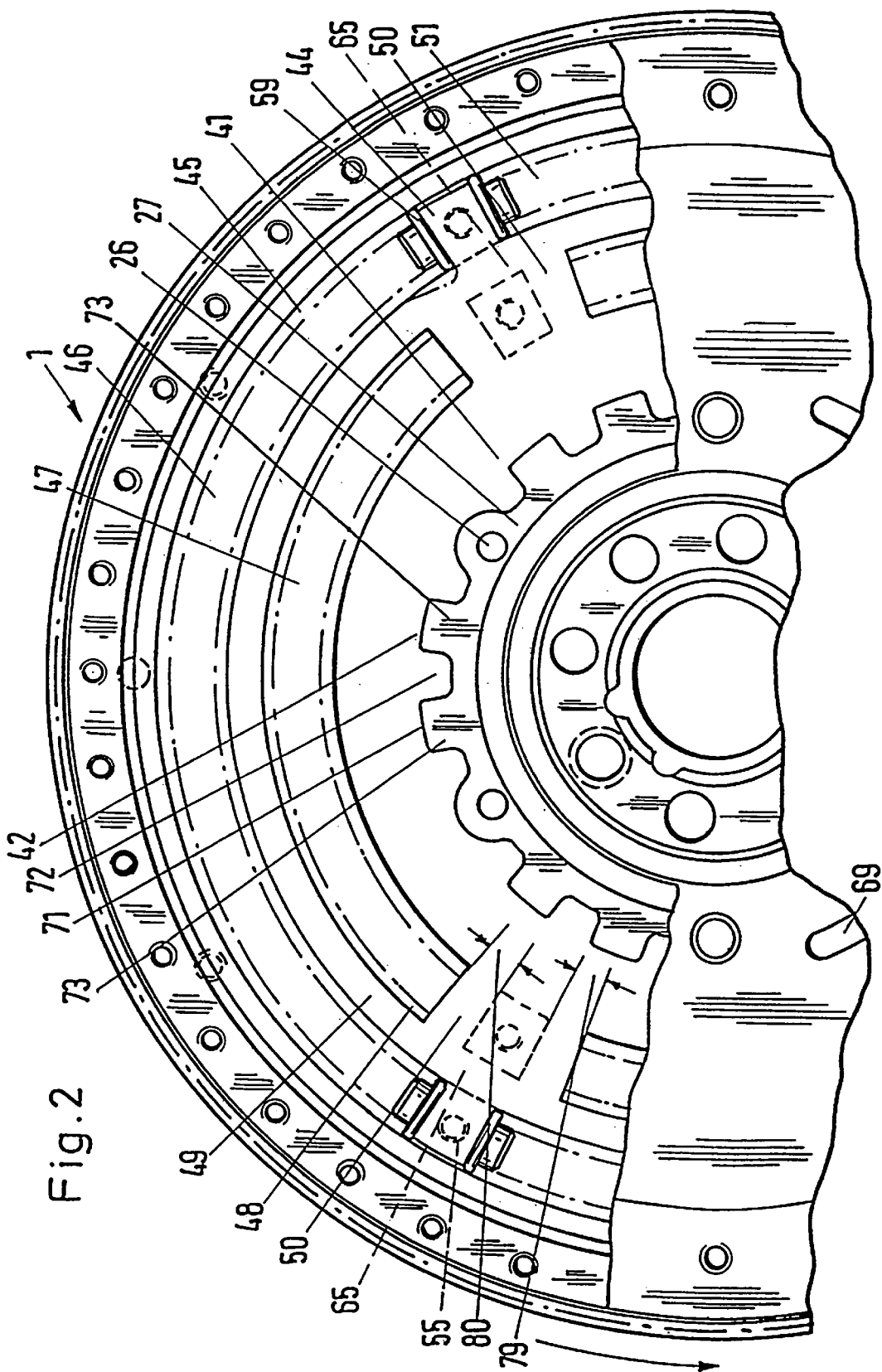
FIG. 2 is a fragmentary end elevational view as seen in the direction of arrow II in FIG. 1.

The apparatus 1 which is shown in FIGS. 1 and 2 is used to damp torsional vibrations between the internal combustion engine and the power train including a change-speed transmission of a motor vehicle. The apparatus 1 can be considered a unit of the power train and comprises a composite flywheel 2 having a first component 3 and a second component 4. The components 3 and 4 (hereinafter called flywheels) are rotatable relative to each other and the flywheel 3 is non-rotatably affixed to the output element 5 (such as a crankshaft) of the engine by an annulus of bolts 6 or analogous fastener means. The flywheel 4 is connectable to the input shaft 10 of a change-speed transmission in response to engagement of a friction clutch 7.

The friction clutch 7 comprises an axially movable pressure plate 8 which is disposed between the flywheel 4 and a clutch cover 11 and is non-rotatably but axially movably secured to the flywheel 4 and/or cover 11 by a set of leaf springs (not shown) in the customary way. A diaphragm spring 12 at the inner side of the cover 11 is tiltable between two annular seats and normally bears against the pressure plate 8 to urge the latter toward the friction surface 70 of the flywheel 4 whereby the friction surface 70 cooperates with the adjacent surface of the pressure plate 8 to clamp the friction linings at the periphery of a clutch plate or clutch disc 9 having a hub which is non-rotatably mounted on the input shaft 10 of the transmission. The means for disengaging the clutch 7 can comprise an antifriction bearing which is movable in the direction of arrow II in FIG. I in order to engage the radially inwardly extending prongs of the diaphragm spring 12 and to thereby tilt the spring so as to allow the pressure plate 8 to move axially and away from the flywheel 4.

The apparatus 1 further comprises damper means including a first or outer damper 13 and a second or inner damper 14. The dampers 13, 14 are disposed between the flywheels 3, 4 and serve to oppose but to permit angular movements of the flywheel 3 relative to the flywheel 4 and/or vice versa. The damper 14 operates in parallel with the damper 13.

The means for rotatably mounting the flywheel 4 on the flywheel 3 or vice versa comprises antifriction bearing means 15 including an antifriction ball or roller bearing 16 having a single annulus of rolling elements. The illustrated rolling elements are balls which are mounted between an outer race 17 and an inner race 19 of the bearing 16. The outer race 17 is installed in an axial recess 18 of the flywheel 4, and the inner race 19 surrounds an axial protuberance 20 which is an integral part of the flywheel 3, which extends axially in a direction away from the output element 5 of the engine, and which is received in the recess 18 of the flywheel 4. The inner race 19 is a press fit on a cylindrical peripheral surface or seat 20a of the protuberance 20 and is held against axial movement relative to the flywheel 3 by an external annular shoulder 21 of the protuberance 20 and a washer-like retaining ring 22 which is secured to the end face of the protuberance 20 by a set of screws or other suitable fastener means.

The means for holding the outer race 17 of the bearing 16 against axial movement relative to the flywheel 4 comprises two rings 23, 24 each of which has a substantially L-shaped cross-sectional outline and which extend into the recess 18. A disc 27 cooperates with the rings 23, 24 to hold the outer race 17 against axial movement relative to the flywheel 4. The disc 27 can be considered an integral part of the flywheel 4; it is permanently (or more or less permanently) secured to the flywheel 4 by rivets 26 or other suitable fastener means. The radially extending portion 23a of the ring 23 abuts the adjacent side of the disc 27, and the radially extending portion 24a of the ring 24 abuts a shoulder 25 which is machined into or is otherwise formed in the recess 18. Thus, the outer race 17 is confined between the rings 23, 24 and these rings are respectively flanked by the disc 27 and shoulder 25. The rings 23, 24 together form a thermal insulator which prevents or reduces the transfer of heat between the friction surface 70 of the flywheel 4 and the bearing means 15. Each of these rings further includes an axially extending cylindrical portion which surrounds the adjacent part of the peripheral surface of the outer race 17. The portions 23a, 24a of the rings 23, 24 preferably extend radially inwardly beyond the outer race 17 so that they are adjacent the respective end faces of the inner race 19. It is preferred to configurate and mount the radially extending portions 23a, 24a of the rings 23, 24 in such a way that they actually bear against.(i.e., sealingly engage) the respective end faces of the inner race 19 so as to confine the lubricant (e.g., a suitable grease) for the rolling elements of the antifriction bearing 16. The sealing action of the radially extending portions 23a, 24a can be enhanced by resilient elements 28, 29 (e.g., diaphragm springs) which are provided to urge the radially innermost parts of the portions 23a, 24a against the respective end faces of the inner race 19. The resilient element 28 reacts against the disc 27 and bears against the radially innermost part of the radially extending portion 23a, and the resilient element 29 reacts against the radially innermost portion of the flywheel 4 and bears against the radially innermost part of the radially extending portion 24a.

The flywheel 3 constitutes or forms part of a housing defining an annular chamber 30 for the dampers 13 and 14. This flywheel comprises two substantially shell-shaped parts or sections 31, 32 having radially outermost portions which are secured to each other by threaded fasteners 33 in the form of screws or the like. These fasteners ensure that the inner side or surface 34 of the part 31 abuts the adjacent side or surface 35 of the part 32. The sides 34, 35 of the parts 31, 32 of the flywheel 3 are located radially outwardly of the chamber 30 and of the dampers 13, 14 therein. The means for sealing the chamber 30 in the region of the abutting sides 34, 35 of the parts 31, 32 comprises at least one sealing ring 36 which is recessed into the side 34 and/or 35 and is deformed in response to the application of fasteners 33. Such fasteners are disposed radially outwardly of the sealing ring 36. In the embodiment of FIGS. 1 and 2, the sealing ring 36 is recessed into a groove 37 in the side 34 of, the part 31. In order to ensure accurate positioning of the parts 31, 32 relative to each other during assembly of the apparatus 1, these parts are provided with registering axially parallel bores or holes which are disposed radially outwardly of the sealing ring 36 and receive centering pins 38.

The radially outermost portion of the part 31 of the flywheel 3 is formed with a circumferentially extending cylindrical surface 39 which is surrounded by a ring-shaped starter gear 40. The parts 31, 32 of the flywheel 3 can be made of cast iron. However, if it is desirable to reduce the inertia of the flywheel 3, at least one of the parts 31, 32 (particularly the part 31) can be made of a light metal alloy, particularly a casting of aluminum alloy. An advantage of such cast lightweight parts is that they can be mass-produced in accordance with a compression, molding, stamping or like technique and require a minimum of secondary treatment.

The axial position of the gear 40 can be selected by causing such gear to abut the tips of the fasteners 33, i.e., the fasteners can serve as a means for locating the gear 40 in a predetermined axial position with reference to the flywheel 3.

The dampers 13, 14 comprise a common output member in the form of a radial flange 41 which is disposed axially between the parts 31, 32 of the flywheel 3. As shown in FIG. 2, the radially innermost portion of the flange 41 is non-rotatably but axially movably connected to the disc 27 by a torque transmitting connection 42. The disc 27 is secured to the flywheel 4, and more specifically to the end face of the axially extending projection 43 of the flywheel 4 by means of the aforementioned rivets 26. The projection 43 extends toward the output element 5 of the engine. In order to facilitate and ensure accurate centering of the disc 27 on the projection 43 during assembly of the apparatus 1, the projection 43 is or can be provided with a centering seat 43a for the disc 27.

The flange 41 comprises radially outwardly extending abutments or arms 44 which alternate with energy storing elements 45 of the outer damper 13. Each such energy storing element 45 constitutes an arcuate coil spring. The arms 44 alternate with recesses 46 for the respective coil springs 45, and each such recess is disposed radially outwardly of one of three arcuate windows 47 for energy storing elements 48 (preferably coil springs) of the inner damper 14. The flange 41 further comprises arcuate webs or ribs 49 which extend in the circumferential direction of the flywheel 3 between the recesses 46 and the windows 47. The ribs 49 connect the neighboring arms 44 to each other and which also connect to each other radially extending partitions or webs 50 which are provided between neighboring windows 47 of the flange 41. The coil springs 45 of the outer damper 13 can bear against the arms 44, and the coil springs 48 of the inner damper 14 can bear against the radially extending webs 50. The ribs 49 and webs 50 together form a ring between the dampers 13 and 14.

The radially outermost portion of the chamber 30 has a substantially circular cross-sectional outline and forms a compartment 51 for the arms 44 of the flange 41 as well as for the coil springs 45 of the outer damper 13. The compartment 51 is formed primarily by arcuate grooves 52, 53 which are mirror symmetrical to each other and are respectively provided in the sides or surfaces 34, 35 of the parts 31, 32. The grooves 52, 53 flank the radially outermost portion (including the arms 44) of the flange 41 and each thereof receives a little less than one-half of each coil spring 45. The radially innermost portion of the compartment 51 of the chamber 30 is substantially sealed by the ribs 49 of the flange 41 save for a relatively narrow radially extending clearance or gap 54 at one side of the flange 41. The compartment has a circular cross-sectional outline which is complete (closed) save at the location of entry of the flange 41.

As shown in FIG. 1, the configuration of the grooves 52, 53 in the parts 31, 32 of the flywheel 3 is selected in such a way that the corresponding portions of the coil springs 45 are received therein with a minimum of play. The surfaces bounding the radially outermost portions of the grooves 52 and 53 can serve to guide and confine the adjacent radially outermost portions of the convolutions of coil springs 45 in the compartment 51 of the chamber 30. The arrangement is such that the radially outermost portions of the convolutions of coil springs 45 abut or can abut the surfaces bounding the adjacent radially outermost portions of the grooves 52 and 53, at least when the composite flywheel 2 rotates and the coil springs 45 are acted upon by centrifugal force. A reasonably large surface-to-surface contact between the convolutions of the coil springs 45 and the parts 31, 32 of the flywheel 3 is often desirable in order to achieve a substantial reduction of wear and, more specifically, to distribute the wear over larger portions of the convolutions and surfaces bounding the grooves 52, 53 in the radially outermost portion of the compartment 51.

The end convolutions of the coil springs 45 bear against abutments or stops 55, 55a which are provided in the compartment 51 so that they extend into the grooves 52, 53 and flank the adjacent radially outwardly extending arms 44 of the flange 41. As shown in FIG. 2, the abutments 55 and 55a can be oriented in the same way as the adjacent arms 44, i.e., substantially radially of the flywheel, 3. The abutments 55, 55a have substantially mirror symmetrical parts 56, 57 which are respectively received in the grooves 52, 53 and are affixed to the corresponding parts 31, 32 of the flywheel 3 by rivets 58 or in any other suitable way. Portions of the abutments 55, 55a are preferably flattened to ensure a more satisfactory engagement with the respective coil springs 45. Each arm 44 is located between two abutments 55, 55a as seen in the axial direction of the apparatus 1.

Cup-shaped spring retainers 59 are provided at the circumferential ends of the arms 44 (see FIG. 2). The cross-sectional area of each retainer 59 matches or approximates the cross-sectional area of the compartment 51. Each retainer 59 is located between an arm 44 and one end of the respective coil spring 45.

The sides or surfaces 34, 35 of the parts 31, 32 include circumferentially complete ring-shaped portions 60, 61 which are disposed radially inwardly of the compartment 51 and flank a ring-shaped passage 62 for the corresponding portion of the flange 41. The width of the passage 62 (as measured in the axial direction of the flywheel 3) slightly exceeds the thickness of the corresponding portion of the flange 41 (namely the thickness of the portion between the portions 60, 61 of the sides or surfaces 34, 35) so that the flange 41 and at least one of the parts 31, 32 define the aforementioned gap 54. The width of the gap 54 can be 0.1–2 mm.

The surface portions 60, 61 which flank the ring-shaped passage 62 are disposed radially outwardly of a second compartment which includes arcuate grooves 63, 64 machined into or otherwise formed in the parts 31, 32 and serving to receive portions of the coil springs 48 which form part of the inner damper 14. The diameters of convolutions of the coil springs 48 are such that each such convolution extends axially beyond both sides of the adjacent portion of, the flange 41.

FIG. 1 shows that at least the radially outermost portions of the grooves 63, 64 are bounded by surfaces which are complementary to the surfaces of adjacent coil springs 48 so that the coil springs 48 are at least partially guided and confined by such surfaces, at least in the axial direction of the apparatus 1. Each of the grooves 63, 64 preferably extends through an angle of 360 degrees, the same as the grooves 52, 53 which form part of the compartment 51 for the coil springs 45. This is of advantage because the grooves 52, 53, 63 and 64 can be formed during casting of the parts 31, 32 and can be finished by turning or in accordance with another suitable material removing technique. The means for stressing the coil springs 48 (i.e., for stressing the energy storing elements of the inner damper 14) comprises abutments or stops 65, 66 which are installed in the grooves 63, 64 and are preferably provided with flattened portions in contact with the hollow ends of the coil springs 48. Thus, the configuration of each of the abutments 65, 66 preferably conforms to that of the adjacent portion of the surface bounding the respective groove 63, 64, and these abutments are affixed to the respective parts 31, 32 of the flywheel 3 by rivets 67. FIG. 2 shows that the abutments 65, 66 (which are disposed at opposite sides of the radially extending webs 50 of the flange 41, as seen in the axial direction of the apparatus 1) are shorter than the corresponding webs 50 (as seen in the circumferential direction of the flywheel 3).

The dimensions of the ribs 49 of the flange 41 are selected (with reference to the grooves 63, 64) in such a way that the coil springs 48 abut the ribs 49, at least when the flywheel 3 rotates and the coil springs 48 are acted upon by centrifugal force. This does not entail an excessive amount of wear, especially if the flange 41 is made of steel which is hardened at least along its surface to thus reduce wear upon those portions which are disposed radially and are engaged by the coil springs 48. Another advantage of the feature that the ends of the coil springs 48 bear radially against the webs 49 is that the coil springs 48 can be twisted or turned with the flange 41 before they engage the abutments 65, 66 and this does not result in the development of excessive friction with the parts 31, 32 of the flywheel 3 under the action of centrifugal force, Such friction is often undesirable because it can distort the characteristics of the outer damper 13.

FIG. 2 shows that the apparatus 1 comprises three coil springs 45 and three coil springs 48. Each outer coil spring 45 extends along an arc of close to or exactly 110 degrees, and the arcs formed by the inner coil springs 48 preferably equal or approximate the arcs covered by the outer coil springs 45. In the embodiment of FIGS. 1 and 2, each inner coil spring 48 extends along an arc of approximately or exactly 100 degrees. Thus, the three outer coil springs 45 jointly extend along an arc which approximates 91 percent of a complete circle, and the three inner coil springs 48 jointly extend along an arc which approximates 83 percent of a complete circle.

The coil springs 45 and/or 48 are or can be straight prior to introduction into the respective compartments of the flywheel 3. If the coil springs are originally straight, they must be deformed during insertion into the chamber 30. However, it is equally within the purview of the invention to make the coil springs 45 and/or 48 in such a way that their curvature matches or approximates that of the respective compartments in the flywheel 3 before the springs are installed in the chamber 30. The utilization of "prefabricated" coil springs whose curvature matches or approximates that of the grooves 52, 53 and 63, 64 is preferred for convenience of assembly as well as to reduce internal stresses which develop during compression. Moreover, the prefabricated coil springs (i.e., springs whose curvature matches or approximates the curvature of the compartment 51 and grooves 63, 64 prior to installation of the springs in the housing of the flywheel 3) are devoid of bending moments in neutral positions of the flywheels.

The chamber 30 contains a supply of a viscous fluid medium which is a lubricant. For example, the chamber 30 can be partially filled with silicon oil or grease. The quantity of viscous fluid medium is preferably selected in such a way that, when the apparatus 1 is idle (i.e., when the flywheels 3 and 4 do not rotate), the upper level of the supply of fluid medium extends at least to the level of the axis of the lowermost outer coil spring 45 so as to ensure that such spring will dip into the supply of lubricant. It is presently preferred to select the upper level of the fluid medium in such a way that the lowermost inner coil spring 48 dips into the fluid medium, at least at the lowermost point of its axis and at the very least to such an extent that at least a portion of one or more lowermost convolutions of the lowermost coil spring 48 dips into the supply of lubricant. This ensures the development of an adequate film of lubricant between the lowermost convolutions of the lowermost spring 48 and the adjacent surfaces, particularly the surfaces of the respective web or webs 49, with attendant reduction of wear upon such surfaces. It is assumed that the axis of the apparatus 1 which is shown in FIGS. 1 and 2 is horizontal and that the supply of fluid medium in the chamber 30 extends to the level of the lowermost portion of the axis of the lowermost coil spring 48.

An advantage of the feature that the chamber 30 is provided in the flywheel 3, which is connected with the output element 5 of the engine, is that the chamber 30 is as remote from the flywheel 4 and from the friction clutch 7 as possible, i.e., that the supply of fluid medium in the chamber 30 is less likely to be affected by heat which is generated at the friction surface 70 of the flywheel 4 when the clutch 7 is being engaged or disengaged.

The apparatus 1 further comprises means for ventilating the region of the chamber 30 in the flywheel 3. Such ventilating means includes a radially extending annular channel 68 which is provided between the part 32 and the flywheel 3 and the radially innermost portion of which communicates with passages 69 provided in the flywheel 4 radially inwardly of the friction surface 70. The radially outermost portion of the channel 68 is open to the surrounding atmosphere.

As can be seen in FIG. 2, the flange 41 has a centrally located opening 71 bounded by a surface which is provided with radially inwardly extending tooth-like projections 72 mating with complementary tooth-like projections 73 at the periphery of the disc 27. The projections 72 and 73 together constitute the aforementioned connection 42 which ensures that the flange 41 shares all angular movements of the disc 27 but that the flange 41 can find an optimum axial position between the parts 31, 32 of the flywheel 3. This renders it possible to ensure that the width of the aforementioned clearance 54 between the part 32 and the flange 41 in the passage 62 can be very narrow or extremely narrow. Moreover, the connection 42 including the projections 72 and 73 renders it possible to readily compensate for eventual manufacturing tolerances of the parts whose surfaces are adjacent the flange 41.

The means for sealing the chamber 30 further comprises a sealing device 74 which is installed between the disc 27 and the adjacent radially innermost portion of the part 32. The sealing device 74 comprises a substantially washer-like sealing member 75 having an inner portion which engages a shoulder 76 on the aforementioned projection 43 of the flywheel 4. A radially outer or outermost portion of the sealing member 75 bears against the adjacent ring-shaped surface 77 of the radially innermost portion of the part 32. The sealing member 75 can undergo axial deformation not unlike a diaphragm spring. A diaphragm spring 78 is provided, to bias the sealing member 75 axially against the shoulder 76 as well as against the surface 77. The spring 78 is installed in prestressed condition between the sealing member 75 and the flange 41. This spring further serves to bias the flange 41 axially toward the-surface portion 60 so that the gap 54 develops only between the flange 41 and the surface portion 61. This gap communicates with the compartment 51 and with those portions of the chamber 30 which are located radially inwardly of the compartment 51. FIG. 1 shows that the device 74 seals the annular chamber 30 from the aforementioned channel 68 of the ventilating means for the housing (flywheel 3) of the chamber 30. The inner diameter of the sealing member 75 exceeds the outer diameter of the annulus of tooth-shaped projections 73 on the disc 27 i.e., of the connection 42.

The provision of the torque transmitting connection 42 and sealing device 74 renders it possible to simplify the assembly of the apparatus 1. Thus, the flywheels 3 and 4 are assembled with certain parts in a first step, and the thus assembled flywheels are thereupon fixed in optimum axial positions relative to each other by fastening the retaining ring 22 to the protuberance 20 of the flywheel 3. The sealing device 74 is mounted on the flywheel 3 prior to assembly of the flywheels with each other and the bearing means 15 is or can be form-lockingly mounted in the recess 18 of the flywheel 4 before the recess 18 receives the protuberance 20 of the flywheel 3. When the flywheel 4 is being assembled with the flywheel 3, the inner race 19 of the antifriction bearing 16 is slipped onto the protuberance 20 so that the internal surface of the race 19 surrounds the cylindrical external surface 20a of the protuberance 20. The projections 73 are brought into mesh with the complementary projections 72 and, as the flywheels 3 and 4 are being assembled, the radially innermost portion of the sealing member 75 forming part of the sealing device 74 comes into abutment with the shoulder 76 so that the sealing member 75 is deformed (distorted) by the diaphragm spring 78 and bears against the shoulder 76. The final axial fixing of the flywheels 3 and 4 relative to each other involves attachment of the retaining ring 22 to the protuberance 20 of the flywheel 3.

The utilization of torque transmitting connection 42 between the flywheels 3 and 4 is particularly desirable and advantageous when the housing 31+32 forms an integral or detachable part of the flywheel 3, i.e., of that flywheel which is connectable to the output element 5 of the engine, and when the sealing device 74 is constructed and assembled in the aforedescribed manner so that the sealing member 75 is axially stressed directly between the flywheels 3, 4 or between elements which are integral with or attached to the two flywheels. The connection 42 renders it possible to preassemble the apparatus 1 into two units or subassemblies each of which includes one of the flywheels 3, 4 and to thereupon connect the subassemblies to each other by slipping the inner race 19 of the bearing 16 onto the seat 20a of the protuberance 20 of the flywheel 3 prior to attachment of the retaining ring 22 to the end face of the protuberance 20. As shown in FIG. 1, the bolts 6 which secure the flywheel 3 to the output element 5 of the engine can also serve as a means for attaching the retaining ring 22 to the protuberance 20.

The aforediscussed mounting of the flange 41 between the parts or sections 31, 32 of the housing for the chamber 30 in such a way that the flange has a certain freedom of axial movement against the opposition of the diaphragm spring 78 in the sealing device 74 is desirable and advantageous on the additional ground that the flange 41 can find for itself an optimum orientation between the parts 31, 32 without unduly stressing the adjoining elements of the apparatus. Moreover, such mounting of the flange 41 ensures that the apparatus cannot generate a pronounced frictional hysteresis in response to small angular displacements of the flywheels 3, 4 relative to each other when the engine of the motor vehicle is idling and/or under certain other circumstances when the development of pronounced hysteresis is not desirable.

In order to reduce wear upon the convolutions of the coil springs 45, 48 and upon the adjacent portions of surfaces bounding the respective grooves 52, 53 and 63, 64, it is often desirable and advantageous to harden the corresponding portions of the parts 31 and 32. Such hardening can involve any suitable surface hardening procedure. Certain presently preferred treatments include induction hardening, case hardening, hardening with laser beams or flame hardening. If the wear upon the surfaces which are adjacent the coil springs 45 and 48 is expected to be or is indeed very pronounced, it is advisable to coat the corresponding portions of the parts 31, 32 with layers of highly wear-resistant material. Such layers can be applied to the surfaces bounding the entire grooves 52, 53 and 63, 64 or to selected portions of such surfaces, e.g., in regions where the wear as a result of rubbing contact with the coil springs 45, 48 is expected to be very pronounced. For example, the surfaces bounding the grooves 52, 53 and/or 63, 64 can be chemically coated with layers of chromium, nickel, monybdenum or a plastic or ceramic substance. The layers preferably consist of or contain a material which reduces the coefficient of friction between the convolutions of the coil springs and the housing 31+32 to a minimum. The applied layers of such material can undergo a secondary treatment, particularly a polishing or other smoothing treatment, in order to enhance the quality of the surfaces in the regions of rubbing contact with the coil springs. The secondary treatment can be carried out in a grinding, a milling or a like machine.

The recesses 46 in the flange 41 preferably extend along circular arcs of at least 45 degrees, more preferably 65–115 degrees and most preferably 80–100 degrees. When the flywheels 3 and 4 assume their idle or neutral positions, the coil springs 45 jointly extend along a circular arc which is between 70 and 96 percent of a complete circle. As mentioned above, the coil springs 45 are or can be prefabricated in such a way that their curvature matches or at least approximates the curvature of the recesses 46 and ribs 49.

Angular displacement of the flywheels 3 relative to the flywheel 4 and/or vice versa through a relatively large angle is desirable and advantageous in most instances because the resistance to such angular displacement increases rather gradually, at least during the initial stage or stages of angular displacement, which is desirable for the damping of large torsional vibrations and/or abrupt changes in angular velocity of one of the flywheels relative to the other flywheel. Furthermore, this enables the viscous fluid medium in the chamber 30 to dissipate large quantities of energy, i.e., to produce a pronounced hysteresis.

However, the fluid medium is equally capable of damping angular displacements of small amplitude which require small hystereses and develop during operation under load. This is believed to be attributable to the fact that the pressure which develops in the fluid medium depends on momentary speed at which a certain volume of the fluid medium is being displaced. Thus, the damping capacity of the fluid medium (which fills at least the compartment 51 of the channel 30) depends on the nature (extent and velocity) of angular displacement of the flywheels relative to each other. This renders it possible to achieve a substantially automatic regulation of the damping action.

Figure 18:
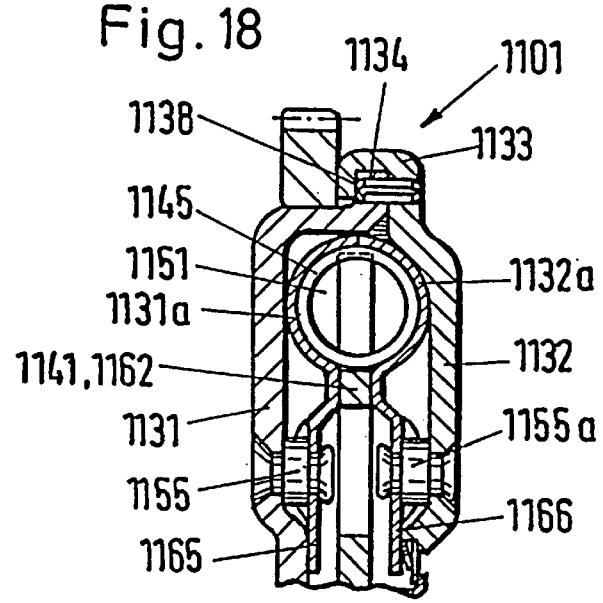
FIG. 18 is a fragmentary axial sectional view of a twelfth apparatus wherein each section of the housing for the damper means has an inner layer and an outer layer.

Each of the sections 31, 32 of the housing for the chamber 30 can include an inner layer which defines the compartment 51 and the compartment including the grooves 63, 64, and an outer layer which surrounds the inner layer. A somewhat similar apparatus (1101) is shown in FIG. 18. It is also possible to provide inner and outer layers in the region of the compartment 51 alone, or only in the region of the compartment which includes the grooves 63, 64 for the energy storing elements 48 of the inner damper 48. The inner layers can be made of a highly wear-resistant material which contains or consists of nickel, chromium, molybdenum of a suitable synthetic plastic substance.

The number of recesses for the coil springs of the outer damper and the number of windows for the coil springs of the inner damper need not exceed four. This ensures that each coil spring is relatively long and allows for a large annular displacement of the flywheels 3 and 4 relative to each other.

The apparatus 1 of FIGS. 1 and 2 operates as follows:

When the flywheel 4 is caused to turn relative to the flywheel 3 from the illustrated idle position, the flange 41 is compelled to rotate with the disc 27 by way of the connection 42 whereby the outer coil springs 45 are compressed between the abutments 55, 55a and the arms 44 and store energy. After the flywheel 4 has covered the angle 79 (see FIG. 2), in one direction or the angle 80 in the opposite direction, the abutments 65, 66 reach the adjacent coil springs 4.8 so that, if the flywheel 4 continues to turn relative to the flywheel 3, the coil springs 48 also begin to store energy. It goes without saying that the situation is analogous if the flywheel 3 turns relative to the flywheel 4 or if both flywheels turn but in opposite directions. The coil springs 45 and 48 continue to store energy at the same time until the compression of the inner coil springs 48 is completed, i.e., when each of the springs 48 resembles, or acts not unlike, a solid block which cannot undergo additional shortening in the circumferential direction of the flywheels. This terminates the angular movement of the flywheel 4 relative to the flywheel 3. In the embodiment of FIGS. 1 and 2 (and starting from the idle position of FIG. 2), the flywheel 4 can turn with reference to the flywheel 3 through an angle of 47 degrees in either direction. The coil springs 45 rub against the surfaces surrounding the grooves 52, 53 of the housing (flywheel 3) for the chamber 30 when the flywheel 4 turns relative to the flywheel 3 and/or vice versa so that the springs 45 cooperate with the parts 31, 32 to produce a frictional damping action. Additional friction is generated as a result of rubbing contact between the flange 41 and the portion 60 of the surface 34 on the part 31 under the bias of the diaphragm spring 78. Still further, frictional damping action develops as a result of sliding contact between the inner coil springs 48 and the adjacent surfaces bounding the grooves, 63 and 64 of the parts 31, 32, respectively.

The frictionally induced damping action between the coil springs 45, 48 on the one hand and the surfaces bounding the grooves 52, 53 and 63, 64 on the other hand varies as a function of changes of rotational speed. Thus, the frictionally induced damping action increases in response to increasing RPM of the flywheels 3, 4 because the coil springs 45, 48 are acted upon by centrifugal force which urges their convolutions against the outer portions of surfaces bounding the respective grooves 52, 53 and 63, 64.

Additional damping action is generated as a result of turbulence in and displacement of viscous fluid medium in the chamber 30. The body of viscous fluid medium in the compartment 51 produces a more pronounced (hydraulic or viscous) damping action because the compartment 51 is practically sealed from the remainder of the chamber 30 and the cup-shaped spring retainers 59 act not unlike pistons which slide in the arcuate cylinder-like compartment 51 of the chamber 30. When the outer coil springs 45 undergo compression, the cup-shaped retainers 59 share the movements of the respective arms 44 toward the corresponding abutments 55, 55a (such abutments also carry, or they can also carry, cup-shaped retainers) so that the viscous fluid medium which is confined in the compartment 51 can escape (in response an abrupt change of the angular positions of flywheels 3, 4 relative to each other) only by way of the very narrow clearance or gap 54 which connects the compartment 51 with other portions of the chamber 30 radially inwardly of the springs 45. The retainers 59 expel primarily viscous fluid which has filled the coil springs 45 prior to compression of such springs as a result of angular displacement of the flywheel 4 relative to the flywheel 3 and/or vice versa. The surfaces bounding the gap 54 act not unlike a flow restrictor. Some fluid medium is also forced to pass or leak between the cup-shaped retainers 59 and the surfaces surrounding the compartment 51. The fluid medium which has been expelled from the compartment 51 radially inwardly is redistributed uniformly in the radially outermost portion of the chamber 30 under the action of centrifugal force.

When the springs 45 are allowed to dissipate energy, some viscous fluid medium in the compartment 51 is again caused to leak between the cup-shaped retainers 59 and the adjacent surfaces bounding the grooves 52, 53 and flows through the gap 54 prior to returning into the radially outermost portion of the chamber 30 under the action of centrifugal force to fill the compartment 51 so that the springs 45 are fully embedded in the fluid medium. The damping action of the fluid medium is a function of the centrifugal force, i.e., such damping action becomes more pronounced when the RPM of the flywheels 3 and 4 increases.

The inner coil springs 48 dip into the supply of viscous fluid medium in the chamber 30, at least in part, to thereby generate turbulence which, in turn, produces a hydraulic or viscous damping action.

The damping action of viscous fluid medium can be altered within a wide range by the expedient of providing one or more cup-shaped retainers 59 with axially extending channels, recesses grooves or holes and/or by the expedient of altering the width of the gap 54. This renders it possible to conform the damping action to requirements in a particular power train. Additional regulation of the damping action which is furnished by the viscous fluid medium can be achieved by removing one or more retainers 59, i.e., by providing cup-shaped retainers only for selected coil springs. It is further possible to provide cup-shaped retainers for one or both ends of one or more inner coil springs 48 and one or more webs 50 of the flange 41. This renders it possible to carry out additional adjustments of the damping action which is furnished by the fluid medium in the chamber 30.

The abutments 55, 55a, 65 and 66 (and/or the cup-shaped retainers 59) can be used as a means for determining and regulating the rate of fluid flow in the respective compartment(s) during certain stages of angular movement of the flywheels 3 and 4 relative to each other to thus ensure the establishment of a predetermined characteristic progress of damping action in dependency on certain operating parameters. Additional regulation can be achieved by appropriate selection of constrictions and/or enlargements in the housing including the parts of sections 31 and 32, i.e., such housing can be configured in such a way that the compartment 51 and/or the compartment 63+64 includes portions of constant cross-sectional area and portions of varying cross-sectional area. This will be described in greater detail with reference to FIG. 7. An advantage of the feature that the coil springs 45 and 48 practically fill the respective compartments 51 and 63+64 is that the surfaces bounding these compartments provide a highly satisfactory guidance for the respective coil springs so that each of the dampers 13, 14 can employ very long coil springs. Relatively long coil springs 45 and 48 allow for larger angular displacements of the flywheels 3 and 4 relative to each other. Furthermore, relatively long coil springs which undergo extensive compression and thereupon expand extensively back to their original length agitate and generate pronounced turbulence in the supply of viscous fluid medium. The turbulence is also generated by the arms 44 and webs 50 of the flange 41 and by the abutments 55, 56 and 65, 66 on the housing parts or sections 31, 32. The hydraulic or viscous damping action which is generated in the just outlined manner varies as a function of the amplitude and frequency of angular displacement of the flywheel 4 relative to the flywheel 3 and/or vice versa and also as a function of the abruptness of such relative movements i.e., as a function of the angular velocity and acceleration. The damping action which is caused by the viscous fluid medium in the chamber 30 is also a function of the RPM of the engine, i.e., this damping action can be varied in dependency on a number of parameters including the angular velocity of movement of the flywheels relative to each other, the acceleration of the flywheels relative to each other and the angular velocity of the composite flywheel 2; each of these parameters can alter the damping characteristics and hysteresis of the apparatus 1.

An advantage of the ribs 49 is that they guide the radially innermost portions of the coil springs 45 in the compartment 45 and the radially outermost portions of coil springs 48 in the compartment including the grooves 63 and 64 of the housing 31+32. The radially outermost portions of the coil springs 48 bear against and are guided by the ribs 49 while they undergo compression or expansion and they merely bear against the ribs 49 when they are not in the process of storing or dissipating energy. The ribs 49 serve a useful purpose also during the intervals when the coil springs 48 do not undergo compression, i.e., while the webs 50 of the flange 41 move relative to the coil spring 48 and/or vice versa. Furthermore, all of the coil springs 48 need not be expanded or compressed at the same time (this will be explained with reference to FIGS. 6 and 7), i.e., such coil springs can be grouped to operate during different stages of angular movement of the flywheels 3 and 4 relative to each other. There is no relative sliding movement between the convolutions of the coil springs 48 and the ribs 49 while the coil springs 48 merely rotate with the flange 41. Thus, no frictional damping action is generated by the flange 41 and coil springs 48 during the just discussed stage or stages of operation of the apparatus 1.

As shown in FIG. 1, the two sections or parts 31, 32 of the housing for the chamber 30 constitute the entire flywheel 3. However, and as shown for example in FIG. 4, the flywheel 3 can include the sections or parts of the housing plus one or more additional parts.

The abutments 55, 55a, 65 and 66 can constitute plates, blocks or heads of rivets whose shanks are anchored in the respective parts 31, 32 of the housing for the chamber 30. Furthermore, the abutments 55, 55a, 65 and/or 66 can be welded to the respective parts of the housing. As mentioned above, wear upon the abutments and on the arms 44, ribs 49 and webs 50 of the flange 41 can be reduced considerably if at least the most affected portions of the surfaces of such elements are surface hardened or coated with layers of hard wear-resistant material. Chromium, molybdenum, nickel and certain plastic substances are presently preferred coating materials. Moreover, it is possible to use certain ceramic materials which can be treated to a high degree of finish and can stand long periods of use without extensive wear.

As a rule, or at least in many instances, the frictional and/or hydraulic damping action of the inner damper 14 is much less pronounced than that of the outer damper 13 which is in parallel with the damper 14. This can be achieved by providing cup-shaped and/or otherwise configured spring retainers only in the compartment 51 and/or by designing the retainers for the coil springs 45 in such a way that they fit more snugly in the compartment 51 than the retainers which are received in the compartment including the grooves 63, 64 for the coil springs 48. In other words, the displacement of fluid medium in the outer compartment should be more pronounced than the displacement of fluid medium in the inner compartment and the flow restrictor means for the fluid in the outer compartment should produce a throttling action which is more pronounced than the throttling action of flow restrictor means in the inner compartment. If the coil springs of the inner damper 14 are assembled into several groups, only one of these groups can be provided with retainers so that the throttling action varies in response to progressing angular displacement of the flywheels relative to each other. Moreover, the coil springs 48 or at least some of the coil springs 48 can be received in the housing 31+32 with a play which exceeds the play between the coil springs 45 and the parts or sections 31, 32. As mentioned above, the damping action can also be influenced by appropriate selection of the quantity of fluid medium in the chamber 30, e.g., in such a way that the compartment 51 is invariably filled when the flywheels 3, 4 rotate but the compartment for the coil springs 48 is filled only in part. This ensures that the damping action of the damper 13 is very pronounced in immediate response to start of angular displacement of at least one flywheel with reference to the other flywheel. The damping action of coil springs 48 (which are normally only partly immersed in the fluid medium) is less pronounced (in fact, it can be much less pronounced than that of the coil springs 45).

The apparatus of FIGS. 1 and 2 can be modified in the following way: The surfaces 60, 61 bounding the passage 62 and/or the adjacent surfaces of the flange 41 (including the surfaces of the ribs 49) can include or constitute ramps which extend in the circumferential direction of the flywheel 3 and are designed to alter the effective area of the gap 54 in response to angular displacement of the flywheel 3 and/or 4 from its neutral position with reference to the other flywheel, preferably in such a way that the effective area of the gap 54 decreases with increasing angular displacement from the neutral position. In other words, the flow restrictor including the flange 41 and the adjacent parts 31, 32 of the housing for the chamber 30 become more effective with increasing angular displacement of one of the flywheels with reference to the other flywheel. The aforementioned ramp or ramps can be provided at one side, at the other side or at both sides of the flange 41 and the height of such ramp or ramps varies in the axial direction of the flywheels 3 and 4.

Figure 3:
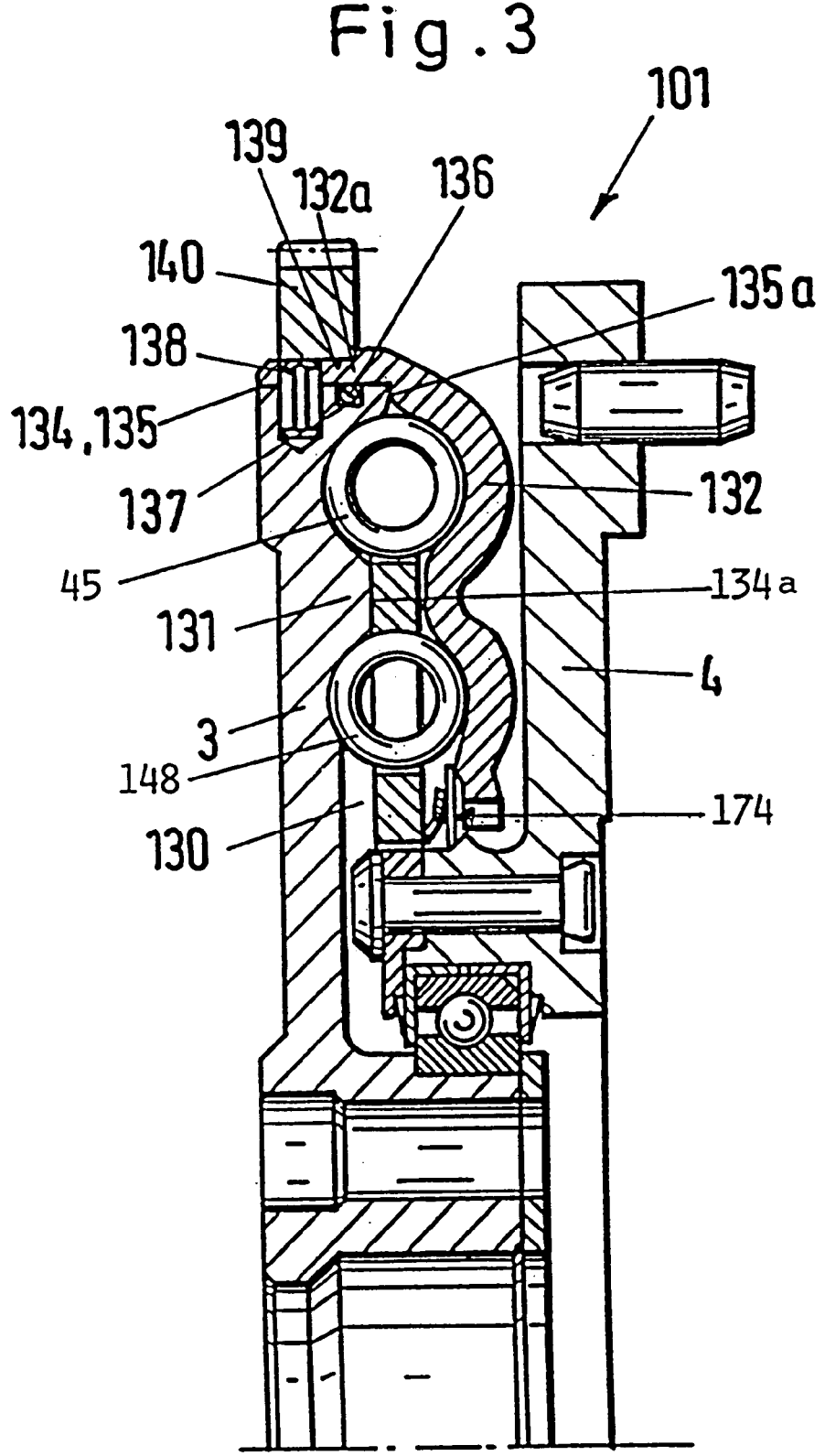
FIG. 3 is a fragmentary axial sectional view of a second apparatus wherein one section of the housing for the dampers serves to center the other section.

FIG. 3 shows a portion of a second apparatus 101 wherein the part 132 of the flywheel 3 is made of a deformable metallic sheet material and includes a cylindrical portion 132a which surrounds the part 131. The part 132 is adjacent but spaced apart from the flywheel 4. The internal surface 135 of the portion 132a is adjacent the peripheral surface 134 of the part 131; the surface 134 serves as a means for centering the part 132 with reference to the part 131 and flywheel 4. A sealing ring 136 (e.g., an O-ring) is recessed into a groove 137 in the surface 134 of the part 131 to seal the radially outermost portion of the chamber 130 from the atmosphere. A radially extending shoulder 135a of the part 132 is located radially outwardly of the compartment for the coil springs 45 and abuts a portion of the radially extending side or surface 134a of the part 131. The shoulder 135a is closely or immediately adjacent the internal surface 135.

The means for holding the parts 131, 132 of the flywheel 3 against axial movement away from each other comprises radially extending centering members or pins 138 in holes which extend transversely of the surfaces 134, 135. The pins 138 are preferably so-called heavy type dowel pins and their outer end portions are surrounded by the-starter gear 140. Each of these pins extends radially across the portion 132a of the part 132 and into the radially outermost portion of the part 131. It will be noted that the sealing ring 136 is disposed between the annulus of pins 138 (only one pin 138 is actually shown in FIG. 3) and the radially outermost portion of the chamber 130. The starter gear 140 surrounds a cylindrical seat 139 forming part of the peripheral surface of the portion 132a. The gear 140 serves its primary purpose and also as a means for holding the properly inserted pins 138 against movement radially and away from the axis of the flywheel 3.

It is clear that the connection between the parts 131, 132 of the flywheel 3 which is shown in FIG. 3 can be used with equal or similar advantage between the parts 31, 32 of the flywheel 3 which is shown in FIG. 1 as well as between analogous parts of flywheels in other embodiments of the improved apparatus. In other words, the connection of FIG. 3 can be used between parts which are made by casting or in sheet deforming or like machines.

An advantage of housing parts which are made of deformable metallic sheet material is that they can be produced at a fraction of the cost of making such parts in a casting machine or in a material removing machine. Moreover, the making of such parts of deformable metallic sheet material renders it possible to impart thereto practically any desired shape. The shaping operation can be carried out in a stamping, embossing, drawing, coining or other suitable machine. The making of one or both parts of the housing for the chamber 130 from such materials is especially desirable and advantageous when the compartment for the coil springs of the outer damper and/or the compartment for the coil springs of the inner damper is not a complete annulus, e.g., if the parts or sections of the housing must be provided with constrictions of the type shown, for example, in FIG. 5. Still further, such mode of making the parts of the housing renders it possible to produce the aforediscussed abutments or stops (corresponding to the abutments 55, 55a and 65, 66 shown in FIG. 1) of the flywheel 3 as integral constituents of the respective sections or parts. This obviates the need for the utilization of rivets 58, 67 and analogous fasteners and contributes significantly to lower initial and assembly cost of the entire apparatus.

Proper angular positioning of the parts or sections 131, 132 relative to each other can be ensured by providing the cylindrical surfaces 134, 135 with non-uniformly distributed holes or bores for the centering pins 138, i.e., by selecting the distribution of the holes in such away that each hole in the surface 134 registers with a hole in the surface 135 only in a single angular position of the part 131 with reference to the part 132.

The sealing device 174 is located radially inwardly of the inner damper between the sections or parts 131, 132. Thus, the coil springs of the inner damper are or can be contacted by the viscous fluid medium. However, it is also possible to install one or two sealing devices between the compartment for the coil springs 145 and the compartment for the coil springs 148, i.e., the inner damper can remain dry.

Figure 4:
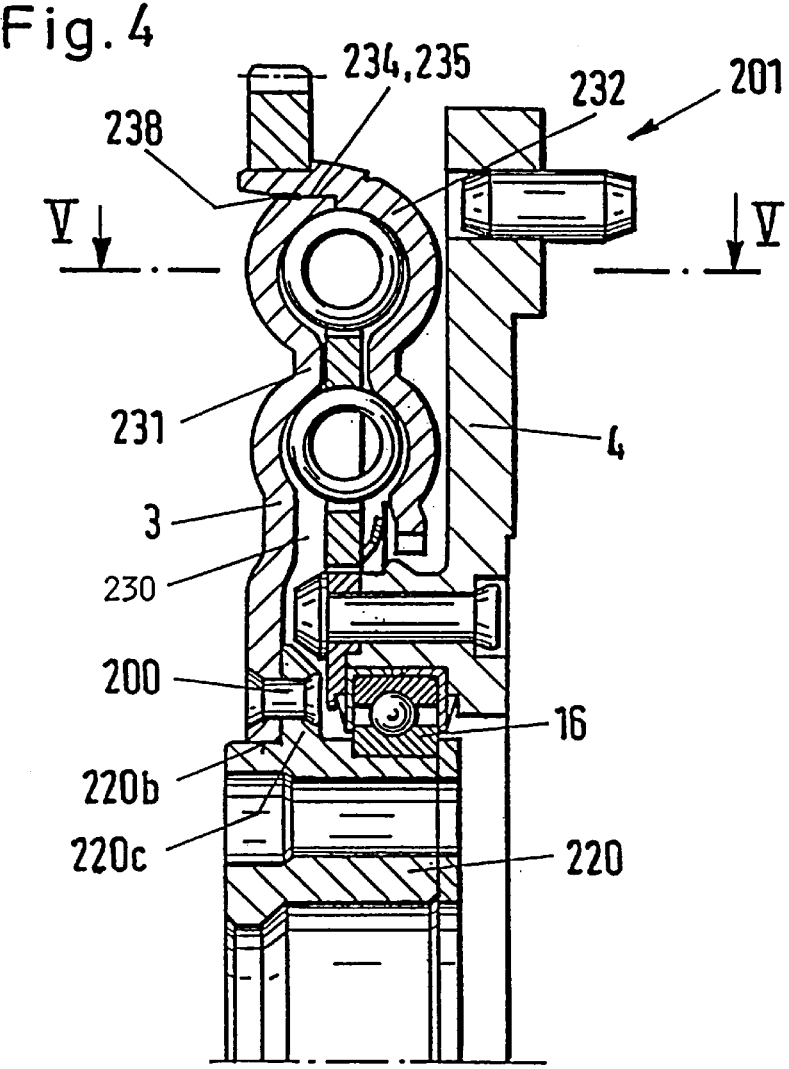
FIG. 4 is a fragmentary axial sectional view of a third apparatus wherein both sections of the housing are made of deformable metallic sheet material.
Figure 5:
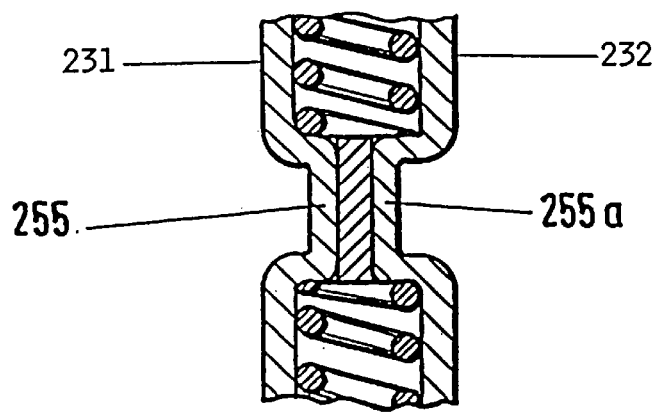
FIG. 5 is a fragmentary sectional view as seen in the direction of arrows from the line V—V of FIG. 4.

FIGS. 4 and 5 show a portion of a third apparatus 201 wherein the housing for the chamber 230 includes two parts 231, 232 each of which is made of a deformable metallic sheet material. The parts 231, 232 are portions of the flywheel 3. The radially outermost portions of the parts 231, 232 are permanently connected to each other at 238, e.g., by welding. This even more reliably ensures that the surfaces 234, 235 of the parts 231, 232 remain in permanent sealing engagement with each other and this also obviates the need for a sealing ring (such as 36 or 136). The permanent connection at 238 can be established in an electron beam welding, resistance butt welding, pressure welding or other suitable welding machine. The radially innermost portion of the part 231 is connected with an axial extension 220 of the flywheel 3 which performs the function of the protuberance 20 shown in the apparatus of FIGS. 1–2 and is surrounded by the antifriction bearing means 16. The extension or protuberance 220 has a centering seat 220b for the part 231 of the flywheel 3, and the part 231 abuts a radially extending shoulder 220c of the extension 220. Rivets 200 are provided to ensure that the part 231 remains in contact with the shoulder 220c. These rivets can be replaced by welds analogous to the connections 238 between the surfaces 234, 235 of the parts 231 and 232. Alternatively, a portion of the extension 220 can be upset to the left of the radially innermost portion of the part 231 to thus establish a permanent and wobble-free connection between 220 and 231.

If the parts which form the housing for the chamber 30, 130 or 230 are made of deformable metallic sheet material, the aforediscussed abutments or stops for the coil springs of the inner and/or outer dampers in the respective chambers can constitute integral parts of the housing. This is shown in FIG. 5 wherein the abutments 255, 255a are integral parts of 231, 232, respectively. These abutments resemble pockets which are formed as a result of suitable deformation of the corresponding parts 231 and 232. This simplifies the making and assembly of the apparatus, i.e., the number of parts which must be separately produced and assembled is reduced considerably.

For the purpose of satisfactory welding, the material (such as steel) of the parts or sections 231, 232 should have a relatively low carbon content. It suffices if the carbon content is low in those regions of the surfaces 234, 235 which are actually welded to each other (at 238).

The apparatus 301 which is shown in FIGS. 6, 6a, 7 and 7a again comprises a composite flywheel having two discrete components or flywheels 3, 4 which are rotatable relative to each other with the respective races of an antifriction ball bearing 16. The means for holding the flywheels 3 and 4 against axial movement away from each other comprises a ring-shaped retainer 322 which is affixed to the end face of the axial protuberance 320 of the flywheel 3 by a set of rivets 322a or the like. The manner in which the flywheels 3, 4 are assembled with each other is or can be the same as described in connection with FIGS. 1 and 2. Thus, the antifriction bearing 16 can be mounted in the flywheel 4 and is thereupon pushed onto the protuberance 320 of the flywheel 3 so that its inner race surrounds the cylindrical surface 320a at the periphery of the protuberance 320. A sealing device 374 is mounted on the flywheel 3 (i.e., on the flywheel which is nearer to the output element of the engine) before the protuberance 320 is inserted into the axial recess of the flywheel 4. The connection 342 between the radially innermost portion of the flange 341 and the radially outermost portion of the disc 327 facilitates assembly of the apparatus 321. The flange 341 again constitutes the output element of the outer damper 13 as well as of the output element of the inner damper 14. The disc 327 is secured to the flywheel 4 by rivets 326.

The parts 331, 332 which constitute the housing for the chamber 330 are castings. The radially outermost portion 332a of the part 332 is a cylinder having a cylindrical internal surface 335 which is adjacent a sealing ring 336 and surrounds the complementary cylindrical external surface 334 of the part 331 so that the latter centers the part 332 and its cylindrical portion 332a. Radially extending pins 338 are provided to hold the parts 331, 332 against axial movement away from each other; such pins are received in registering bores or holes provided therefor in the cylindrical surfaces 334 and 335. The starter gear 340 surrounds the cylindrical portion 332a and prevents expulsion of the pins 338 from their respective bores.

The torque transmitting connection 342 again comprises tooth-like projections 372 which extend radially inwardly from the internal surface of the flange 341 and complementary tooth-like projections 373 which are provided on the disc 327 and mate with the projections 372.

FIG. 6a, shows the details of the sealing device 374 which is installed between the radially innermost portion of the part 332 one the one hand and the axial protuberance or projection 343 of the flywheel 4 and disc 327 on the other hand. The device 374 comprises a washer-like sealing member 375 which is elastically deformable in the axial direction and has an inner portion engaging a ring-shaped insert 376 on the projection 343. The outer portion of the sealing member 375 is coupled to the radially innermost portion of the part 332 so that it is held against movement in the axial direction of the apparatus 301. The sealing member 375 is deformable not unlike a diaphragm spring and its radially outermost and innermost portions are coated with layers 375a, 375b which can consist of or contain synthetic plastic material and can be applied by spraying. The material of the layers 375a, 375b should have a low coefficient of sliding friction and should exhibit a certain amount of elastic or plastic deformability. A ring-shaped coupling and centering member or carrier 380 is provided on the part 332 and is configurated to form an annular groove or socket receiving the radially outermost portion (including the layer 375a) of the sealing member 375. The confinement of the radially outermost portion of the sealing member 375 in the groove or socket which is defined by the carrier 380 is such that the sealing member 375 can change its conicity. That portion (380b) of the carrier 380 which defines the aforementioned groove or socket is received in a ring-shaped centering notch 377 provided therefor in the radially innermost portion of the part 332. The carrier 380 comprises two radially outwardly extending collars 380a which flank the annular innermost portion 332b of the part 332 so as to securely locate the carrier 380 in a desired axial position. The carrier 380 can be said to constitute a swivel bearing for the sealing member 375 of the sealing device 374.

The ring-shaped insert 376 has a surface which is adjacent a surface of the sealing member 375 to form therewith a seal against penetration of foreign matter into the radially innermost portion of the chamber 330 as well as against escape of viscous fluid medium from the chamber. A disc-shaped radially innermost portion 376a of the insert 376 is clamped between the projection 343 of the flywheel 4 and the disc 327, and a dished radially outermost portion 376b of the insert 376 engages the radially innermost portion of the sealing member 375 to that the latter is held in axially stressed position and the insert and sealing member define the aforementioned seal at the radially innermost locus of the chamber 330.

The portions 376a and 376b of the insert 376 are offset with reference to each other in the axial direction of the apparatus 301 in such a way that the portion 376a is immediately adjacent the tooth-like projections 373 of the disc 327 but the portion 376b is axially offset in a direction away from the disc 327 and toward the flywheel 4. The insert 376 cooperates with the sealing member 375 not only to seal the radially innermost portion of the chamber 330 from the atmosphere but also to seal such radially innermost portion of the chamber 330 from the radially extending ventilating channel 368 between the parts 331, 332 on the one hand and the flywheel 4 on the other hand.

Figure 7:
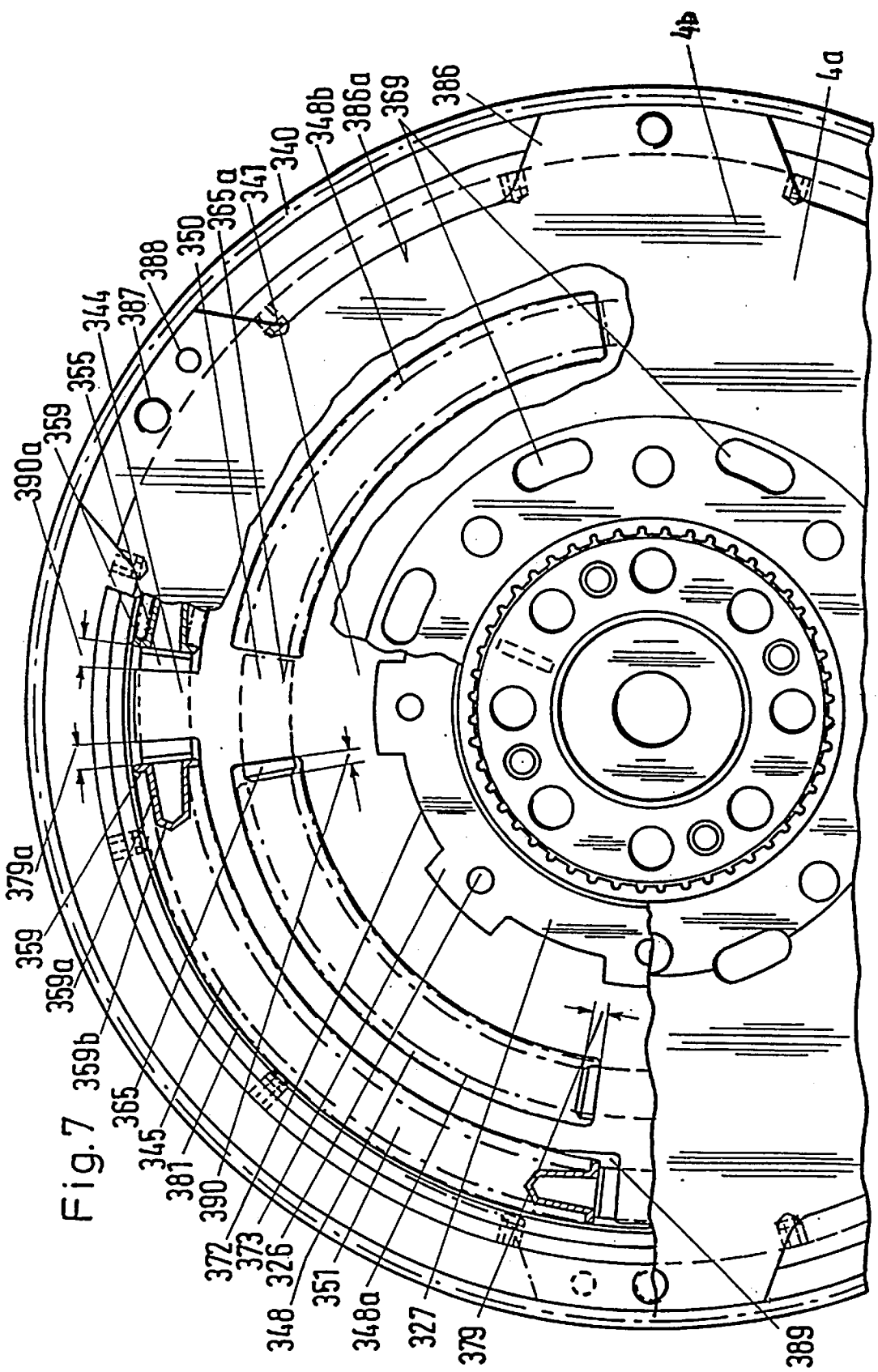
FIG. 7 is a fragmentary end elevational view of the fourth apparatus as seen in the direction of arrow VII in FIG. 6.

In order to facilitate assembly of the flywheels 3 and 4 into the apparatus 301 which is shown in FIGS. 6 and 7, the inner diameter of the sealing member 375 exceeds the outer diameter of the annulus including the radially outwardly extending tooth-like projections 373 which are provided on the disc 327 and form part of the connection 342. The portion 376b of the insert 376, which is in engagement with and stresses the sealing member 375 in the axial direction of the apparatus 301, extends radially outwardly beyond the tooth-like projections 373 of the disc 327.

When the antifriction bearing 16 is slipped onto the cylindrical portion 320a of the peripheral surface of the protuberance 320 on the flywheel 3, the projections 373 move into mesh with the projections 372 of the flange 341 to thereby establish the connection 342. At the same time, the portion 376b of the insert 376 engages and stresses the sealing member 375 to ensure the establishment of a seal between 376b and 375b.

Figure 7A:
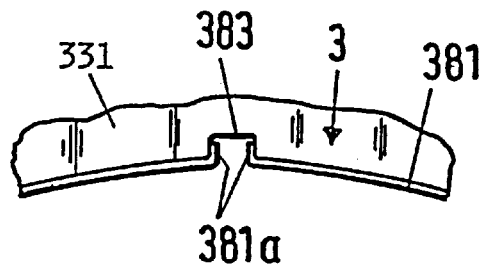
FIG. 7a illustrates the manner on anchoring the ends of a frictional engagement reducing band in the housing of the apparatus which is shown in FIGS. 6, 6a and 7.

In order to prevent or reduce wear upon the surfaces which bound the annular compartment 351 (including the grooves 352, 353 in the parts 331, 332) of the chamber 330 and are contacted by the convolutions of coil springs 345 forming part of the outer damper 13 in the chamber 330, there is provided a strip- or band-shaped frictional engagement reducing member or insert 381 of hardened metallic material (such as steel). The member 381 surrounds the radially outermost portion of the compartment 351 and is adjacent the radially outermost portions of the coil springs 345. In accordance with a presently preferred embodiment, the member 381 constitutes a short cylinder which is received in a shallow recess 382 provided therefor in the part 331 of the flywheel 3. The recess 382 can be formed during casting of the part 331 or is machined into the part 331 thereafter. When the apparatus 301 rotates, the convolutions of the coil springs 345 tend to move radially outwardly under the action of centrifugal force and thus bear against the internal surface of the member 381. The manner in which the member 381 is secured against slippage with reference to the flywheel 3 is shown in FIG. 7a. Thus, the member 381 is a split ring with end portions 381a bent radially outwardly into a notch 383 provided in the part 331 of the flywheel 3.

The circumferential abutments or stops 355, 355a for the coil springs 345 of the outer damper 13 and the circumferential abutments or stop 365, 366 for the coil springs 348 of the inner damper 14 in the chamber 330 are separately produced forgings, stampings or like elements which are respectively provided with one-piece rivets 358, 367 for attachment to the respective parts 331, 332 of the flywheel 3.

FIG. 7 shows that the abutments 355, 355a which flank the arms 344 of the flange 341 extend beyond the respective arms 344 in the circumferential direction of the flywheel 3. In the idle or neutral position which is shown in FIG. 7, the arms 344 are disposed centrally of the respective abutments 385, 355a, i.e., such abutments extend circumferentially beyond both ends of the respective arms 344 through identical distances.

The abutments 365, 366 which flank the radially extending webs 350 of the flange 341 also extend circumferentially beyond the respective webs 350. The webs 350 alternate with the coil springs 348 of the inner damper 14 in the chamber 330. In contrast to the positions of abutments 355, 355a with reference to the respective arms 344 in the idle position of the flange 341, the abutments 365, 366 then extend beyond one end only of the respective webs 350 (as seen in the circumferential direction of the flywheel 3). The other end of each web 350 can be flush with the respective ends of the-associated abutments 365, 366. The selection of the circumferential offset of the abutments 365, 366 and the respective webs 350 relative to each other is such that the neighboring abutments 365 as well as the neighboring abutments 366 are offset in opposite directions. This ensures that the inner coil springs 348 (there are four coil springs 348) form two groups 348a, 348b which become effective during different stages of angular displacement of the flywheels 3, 4 relative to each other.

The chamber 330 again contains a supply of viscous fluid medium (such as silicon oil or grease) which should at least fill the compartment 351 when the apparatus 301 is rotated. It is presently preferred to select the quantity of fluid medium in such a way that it not only fills the compartment 351 but also contacts at least the radially outermost portions of the coil springs 348 when the flywheels 3 and 4 are driven. A filling to the level such that the supply of fluid medium extends radially inwardly to the axes of the coil springs 348 has been found to be quite satisfactory.

Cup-shaped spring retainers 359 are installed in the compartment 351 between the arms 344 and abutments 355, 355a on the one hand and the respective end portions of the coil springs 345 on the other hand. The dimensions of the retainers 359 are or can be selected in such a way that they at least substantially fill the respective portions of the compartment 351, i.e., the retainers 359 can act not unlike pistons when they are caused to move along the surfaces bounding the compartment 351 or vice versa. This ensures that the retainers 359 can produce a desirable damping action by throttling the flow of viscous fluid medium between their peripheries and the surfaces bounding the respective portions of the compartment 351. The damping action is or can be the same as described in connection with FIGS. 1 and 2.

Each cup-shaped retainer 359 is provided with a slightly conical extension or stub 359a which normally extends into the adjacent end convolutions of the respective coil spring 345. This can be seen in the top portion of FIG. 7. Each stub 359a has a tip 359b which is conical but can also be roof-shaped. The just described design of the retainers 359 ensures that the stubs 359a automatically find their way back into the end convolutions of the adjacent coil springs 345 even if the stubs 359a are completely separated from the neighboring springs 345 during certain stages of angular movement of the flywheels 3 and 4 relative to each other. Thus, when a spring 345 is free to expand, its end convolutions automatically receive the stubs 359a of the adjacent retainers 359, and the same holds true when the retainers 359 move toward the adjacent end portions of the respective coil springs 345. This not only guarantees a more reliable operation but also reduces the likelihood of damage to the springs 345 and/or to the retainers 359. The stubs 359a of the retainers 359 are likely to leave the adjacent end portions of the respective coil springs 345 when the springs 345 are compressed and the apparatus 301 is driven at a relatively high RPM. Under such operating conditions, friction between the convolutions of the springs 345 and the adjacent surfaces bounding the compartment 351 of the chamber 330 is or can be so pronounced that the springs 345 cannot expand or cannot fully expand in immediate response to an abrupt change of load. During such abrupt change of load, the arms 344 of the flange 341 displace the viscous fluid medium in the compartment 351 and the fluid medium thereupon flows back radially outwardly under the action of centrifugal force. Such flow of fluid medium during an abrupt change of load and the resulting angular displacement of the flywheels 3, 4 relative to each other can result in expulsion of stubs 359a of the retainer 359 from the adjacent end portions of the respective coil springs 345 because the springs 345 are slow to expand for the aforediscussed reasons.

It will be noted that the layer or coating 375a on the radially outermost portion of the sealing member 375 is not in the path of flow of viscous fluid medium radially inwardly in response to an abrupt angular displacement of the flywheel 3 relative to the flywheel 4 and/or vice versa. This ensures that the fluid medium (e.g., grease) which flows radially inwardly along the right-hand side of the flange 341 (as seen in FIG. 6 or 6a) cannot penetrate into the notch 377 of the part 332 to escape into the channel 368 between the part 332 and the flywheel 4. The notch 377 is sufficiently deep (as seen in the axial direction of the flywheels) to ensure that the major part at least of the layer 375a can be received therein to thus maintain the sealing member 375 away from the path of the fluid medium when the latter flows radially inwardly along the sealing device 374. An additional advantage of the construction which is shown in FIG. 6a is that, when the fluid medium in the chamber 330 is pressurized in response to abrupt angular displacement of the flywheels relative to each other, the fluid medium acts upon the entire left-hand side of the sealing member 375 so as to urge the latter into a more pronounced sealing engagement with the part 332 (at 375a) as well as against the flywheel 4 (i.e., against the insert 376 which can be said to constitute a portion of the flywheel 4). Thus, the sealing action of the member 375 is enhanced in automatic response to pressurization of fluid medium in the chamber 330.

The apparatus 301 operates as follows:

When the flywheel 4 is caused to turn with reference to the flywheel 3 so that it leaves the idle position of FIG. 7, the flange 341 is compelled to rotate through the medium of the connection 342 (i.e., the projections 373 of the disc 27 on the flywheel 4 transmit torque to the projections 372 of the flange 341). This results in compression of coil springs 348 which form the group 348b because the corresponding webs 350 of the flange 341 move with reference to the abutments 365, 366 on the parts 331, 332 of the flywheel 3. When the flywheel 4 completes an angular displacement through the angle 379 in one direction or through the angle 390 in the opposite direction, the webs 350 of the flange 341 (which turns with the flywheel 4) engage the adjacent ends of the coil springs 348 which form the group 348a so that, if the flywheel 4 continues to turn with reference to the flywheel 3, the coil springs 348 of the group 348a are compressed and store energy jointly with the coil springs 348 of the group 348b. When the flywheel 4 thereupon completes an additional angular displacement through the angle 379a in one direction or through the angle 390a in the opposite direction, the arms 344 of the flange 341 engage and begin to compress the respective coil springs 345 so that the springs 345 begin to store energy (or to store additional energy, depending upon their initial condition) because they are acted upon by the arms 345 in conjunction with the respective abutments 355, 355a on the parts 331, 332 of the flywheel 3. In the embodiment which is shown in FIGS. 6 to 7a, the angle 379 equals or closely approximates the angle 379a, and the angle 390 equals or closely approximates the angle 390a. Thus, the coil springs 345 store energy simultaneously with the coil springs 348 of the group 348a. Therefore, the characteristic curve of these springs is a two-stage curve.

It is equally within the purview of the invention to design the apparatus 301 in such a way that the angles 379, 390 merely approximate the respective angles 379a, 390a or that the angles 379, 390 are entirely different from the angles 379a, 390a, respectively, i.e., the characteristic curve can have three or more stages or steps in one direction of rotation and two stages or steps in the opposite direction or the characteristic curve can have more than two stages or steps in one direction and three or more stages or steps in the opposite direction.

The arrangement may be such that each coil spring 345 begins to store energy during a different stage of angular displacement of the flywheels relative to each other. The same applies for the coil springs 348 of the inner damper. This applies regardless of whether the dampers are connected in series or in parallel.

It is further possible to shift the abutments 365, 366 with reference to the coil springs 348 of the group 348b to positions corresponding to that which is shown in FIG. 7 by phantom lines, as at 365a, to thus ensure that the bias of the springs 348 in the group 348b does not change in immediate response to angular displacements of the flywheel 3 and/or 4 from the idle position of FIG. 7 in either direction. At such time, the apparatus 301 merely produces a hydraulic or viscous damping action and/or a frictional damping action.

The magnitude or characteristics of the hydraulic or viscous damping action can be varied in a number of ways. For example, the number of cup-shaped retainers 359 can be reduced (i.e., only certain coil springs 345 can be provided, with such retainers or only one end of each coil spring can be provided with a retainer). Furthermore at least one coil spring 348 in the group 348a and/or 348b can be provided with one or two cup-shaped retainers corresponding to the retainers 359 or analogous retainers. Other factors which influence the hydraulic or viscous damping action include the selected quantity of fluid medium in the chamber 330 and/or the width of the clearance or gap between the flange 341 and the portion 360 or 361 of the surface on the part 331 or 332 of the flywheel 3. Additional damping action is produced as a result of turbulence of the viscous fluid medium in the chamber 330. The exact manner in which such damping action is produced is the same as described in connection with FIGS. 1 and 2.

FIG. 7 shows that the outer damper 13 of the apparatus 301 comprises four equidistant coil springs 345 and the inner damper 14 comprises four equidistant coil springs 348. Each of the coil springs 345 extends along an arc of or close to 78 degrees, each coil spring 348 in the group 348b extends along an arc of or close to 74 degrees, and each coil spring 348 of the group 348a extends along an arc of or close to 68 degrees. Thus, the four coil springs 345 jointly extend along approximately 86 percent of a complete circle, and the four coil springs 348 jointly extend along approximately 79 percent of a complete circle.

The flywheel 4 includes a portion 4b which has radially outwardly extending projections or lugs 386 (FIG. 7) each of which has a tapped axially parallel bore 387 to facilitate the attachment of a friction clutch. One or more lugs 386 are further provided with bores or holes 388 which are parallel to the respective tapped bores 387 and serve for reception of pins (not shown) which facilitate centering of the clutch cover on the flywheel 4 during assembly of the friction clutch with the flywheel 4.

The lugs 386 contribute to a reduction of the weight of the flywheel 4 as a result of removal or absence of material in recesses or tooth spaces 386a which alternate with the lugs 386, as seen in the circumferential direction of the flywheel 4. Moreover, the recesses 386a provide paths for the flow of air which cools the flywheel 4, the supply of fluid medium in the chamber 330 and the clutch which is affixed to the flywheel 4. Atmospheric air which flows through the recesses 386a contacts the flywheel 4 and the aforementioned cover of the clutch which is attached to the flywheel 4 by threaded fasteners extending into the tapped bores 387 of the lugs 386. The flywheel 4 is further formed with air-conveying passages 369 which communicate with the radially innermost portion of the channel 368 between the flywheels 3 and 4.

The thickness of the lugs 386 on the portion 4b of the flywheel 4 can exceed the thickness of the remaining portion of the flywheel 4. Such design of the flywheel 4 can be resorted to in order to ensure that the mass or weight of the flywheel 4 will equal or approximate a preselected value and/or to prevent overheating of the portion 4b (which is outwardly adjacent the friction surface 4a).

The damping action which is provided by the viscous fluid medium can be further varied by forming the parts 331, 332 of the flywheel 3 with grooves 352, 353 which have portions of different cross-sectional areas. Thus, the compartment 351 can include at least one portion of larger cross-sectional area and at least one portion of smaller cross-sectional area. The damping action in the portion or portions of larger cross-sectional area is less pronounced. The compartment 351 can be configurated in the just described manner in the region of one, two, three or all four coil springs 345. The portions of larger cross-sectional area can be provided anywhere along the length of one or more coil springs 345 but are preferably provided in regions receiving the end portions of the coil springs 345 when such springs are not compressed or store a minimum of energy. The transitions from the portions of smaller cross-sectional area to the portions of larger cross-sectional area or vice versa can be gradual or abrupt. It is presently preferred to provide the enlarged portions of the compartment 351 in the region or regions of the smaller-diameter portion of such compartment. This can be seen in FIG. 7, as at 389, where the enlarged portion of the cross-sectional area of the compartment 351 is close to the axis of the composite flywheel 3+4 and includes a first part with abrupt transition from the larger cross-sectional area to the smaller cross-sectional area as well as a portion with a gradual transition. The enlarged portion of the compartment 351 can be formed by removing material from the part 331 or 332 of the flywheel 3 and/or from the flange 341 (this is actually shown in FIG. 7). The damping action of viscous fluid medium can be varied within a rather wide range by appropriate selection of the length and/or cross-sectional area of the enlarged portion or portions of the compartment 351, i.e., by enlarging one or more portions of the groove 351 and/or 352 and/or by removing more or less material from the flange 341 in the region of the outer damper 13.

Figure 8:
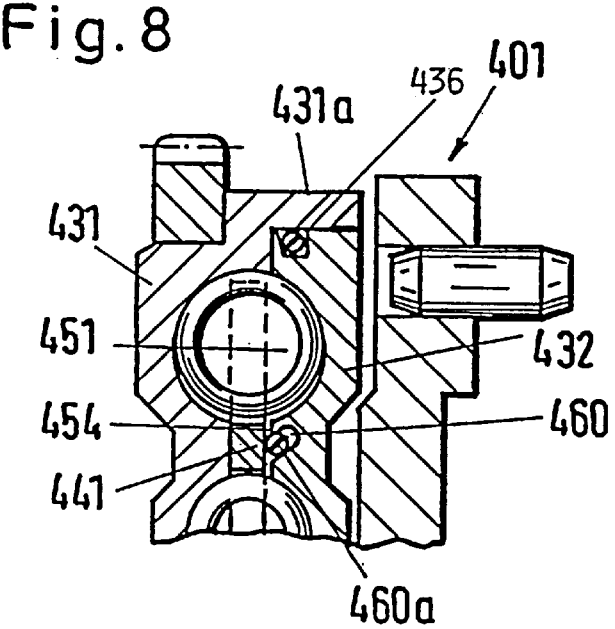
FIG. 8 is a fragmentary axial sectional, view of a fifth apparatus wherein the compartment for the outer damper is sealed from the compartment for the inner damper in a different way.

FIG. 8 shows a portion of an apparatus 401 wherein the part 432 of the housing for the chamber which confines the inner and outer dampers has a circumferentially complete groove 460 for a sealing ring 460a. The sealing ring 460a is elastic in the radial direction and can constitute an open wire ring or it can be made of a synthetic plastic material. The cross-sectional configuration of the groove 360 is oval or otherwise elongated and this groove extends at an angle outwardly from the locus (adjacent the flange 441) where it ends in the lefthand side or surface of the part 432. The sealing ring 460a tends to contract to normally engage the adjacent side or surface of the flange 441, but the ring 460a expands under the action of centrifugal force when the RPM of the apparatus 401 is increased so that it ceases to establish a seal between the part 432 and the flange 441. This entails an increase in the effective cross-sectional area of the clearance or gap 454 between the flange 441 and the part 432, i.e., the sealing action of the ring 460a is reduced or terminated and the gap 454 offers a lesser resistance to the flow of viscous fluid medium into and from the radially outermost portion (compartment 451) of the chamber which is defined by the parts 431 and 432. The diameter of the sealing ring 460a is reduced automatically when the RPM of the apparatus 401 is reduced so that the viscous fluid medium urges the sealing ring into more pronounced sealing engagement with the flange 441 in response to increasing angular displacement of the one flywheel relative to the other and/or vice versa.

The part 531 of that flywheel which is affixed to the output element of the engine has an axial extension 431a in the form of a short cylinder which surrounds the radially outermost portion of the part 432. The extension 431a serves as a means for centering the part 432 and it also cooperates with the sealing ring 436 to prevent escape of fluid medium from the compartment 351 radially outwardly between the abutting sides or surfaces of the parts 431 and 432.

Figure 9:
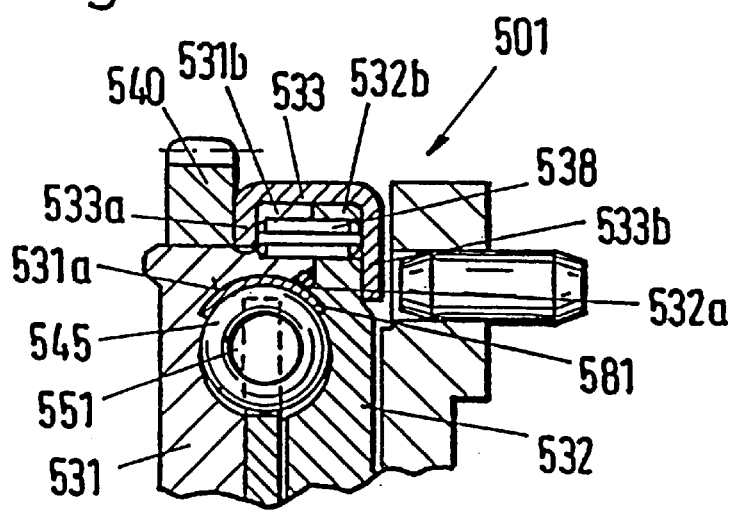
FIG. 9 is a fragmentary axial sectional view of a sixth apparatus wherein the sections of the housing for the damper or dampers are coupled to each other by a ring-shaped cage.

The apparatus 501 of FIG. 9 comprises a strip- or band-shaped frictional engagement reducing member or insert 581 which corresponds to the member 381 of the apparatus 301 and has an arcuate cross-sectional outline with a concave side facing the coil springs 545. This member is made of a hard or hardened material which can resist extensive wear as a result of repeated frictional engagement with the convolutions of the coil springs 545 in the compartment 551. The member 581 can be made of steel and can be hardened in any suitable way. The curvature of the concave side of the member 51 preferably equals or approximates the curvature of convolutions of the adjacent springs 545. As shown 35 in FIG. 9, the member 581 can surround the radially outermost portion of the compartment 551 along an arc of approximately 90 degrees; this member is received in shallow recesses 531a, 532a which are provided therefor in the respective parts 531, 532 of the housing which forms part of the left-hand flywheel and defines the chamber for the inner and outer dampers. The aforementioned arc can be in the range of 45–120 degrees, preferably 60–90 degrees.

Instead of using a member 581 which is hardened, either entirely or along its surface, one can employ a member which has a relatively soft core and a coating of highly wear-resistant material such as hard or solid nickel or chromium. It is also possible to make the member 581 of a highly wear-resistant plastic material.

The apparatus 501 of FIG. 9 exhibits the advantage that the useful life of the flywheel which is connected with the output element of the engine or of the entire apparatus can be prolonged by the simple expedient of replacing a worn or damaged member 581 with a fresh member. In other words, the parts 531, 532 (which can constitute solid castings) are not subject to any wear, or to extensive wear, because they are not in intensive friction engagement with the coil springs 545.

The means for coupling the parts 531 and 532 to each other comprises a ring-shaped member or cage 533 which is or can be made of suitable metallic sheet material and surrounds the radially outermost portion 532b of the part 532 as well as a portion 531a of the part 531 adjacent the starter gear 540. The radially inwardly extending portions 533a and 533b are integral with a cylindrical web of the cage 533 and flank the portions 531b, 532b to thus prevent the parts 531, 532 from moving axially and away from each other.

The means for preventing angular displacements of the parts 531, 532 relative to each other comprises axially parallel centering members or pins 538 each of which can constitute a so-called heavy type dowel pin and which are received in registering axially parallel bores or holes of the portions 531b, 532b. The radially inwardly extending portions 533a and 533b of the cage 533 hold the pins 538 against axial movement. The left-hand radially extending portion 533a of the cage 533 is adjacent the starter gear 540 which is connected to and surrounds the part 531.

The utilization of a frictional engagement reducing member in the form of a strip or band having a concave side or surface which is adjacent the convolutions of the coil springs 545 is desirable and advantageous because this greatly enlarges the area of contact between the member 581 and the coil springs with attendant reduction of pressure per unit area of the abutting surfaces and a considerable reduction of wear. It normally suffices if the member 581 extends around the coil springs 545 along an arc of between 45 and 120 degrees, normally between 60 and 90 degrees.

The one-piece member 581 (or the one-piece member 381 of FIG. 6) can be replaced with a composite member including a plurality of arcuate portions each of which is or can be separately embedded in the housing for the damper or dampers. The length of each arcuate portion can equal or approximate the maximum length of a coil spring in the respective compartment (as measured in the circumferential direction of the flywheels).

Figure 10:
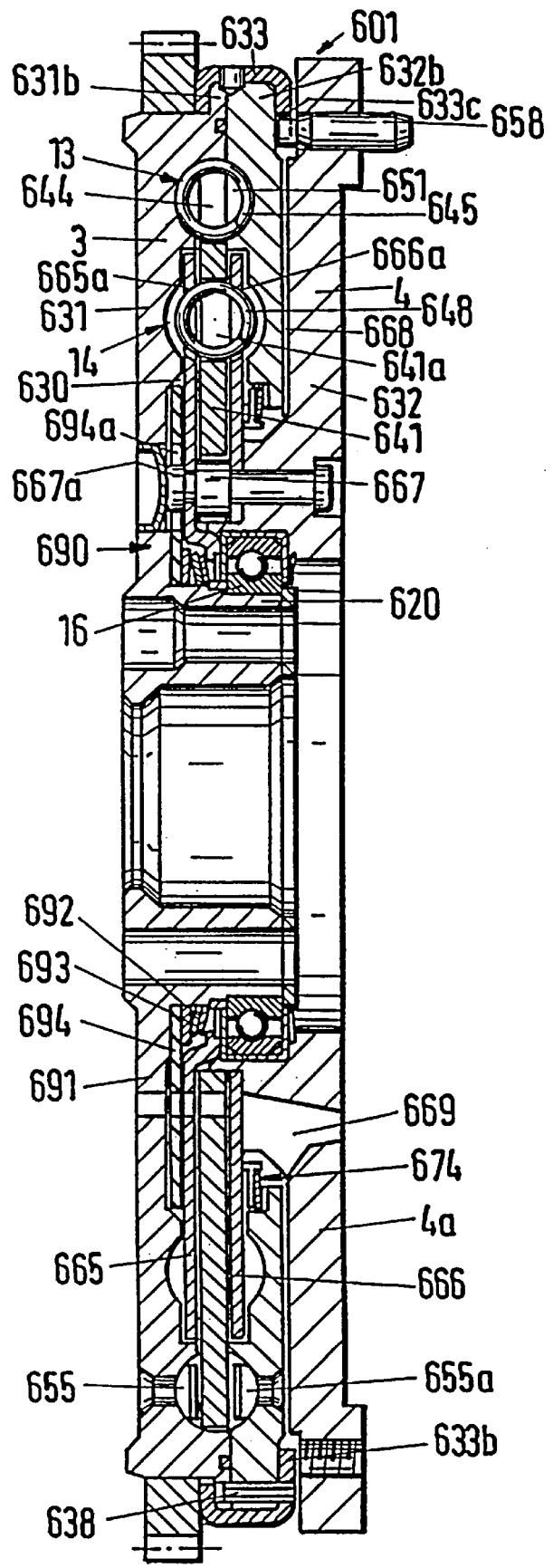
FIG. 10 is an axial sectional view of a seventh apparatus wherein the inner and outer dampers are, connected in series.

The flywheel 3 of the apparatus 601 which is shown in FIG. 10 comprises a housing including the parts 631 and 632 which define an annular chamber 630 for the inner damper 14 and the outer damper 13. The coil springs 645 (only one shown) of the outer damper 13 are installed in the compartment 651 of the chamber 630. The dampers 13, 14 are connected in series. One coil spring of the inner damper 14 is shown at 648. The parts 631, 632 constitute the input element of the outer damper 13 and are provided with abutments or stops 655, 655a for the end portions of the coil springs 645. As shown, the abutments 655 and 655a are respectively riveted to the parts 631 and 632.

A flange 641 constitutes the output element of the outer damper 13 and the input element of the inner damper 14.

The apparatus 601 further comprises disc-shaped members in the form of washers 665, 666 which flank the flange 641 radially inwardly of the compartment 651 and are rigidly connected to each other by distancing elements in the form of rivets 667 which are anchored in the flywheel 4. The washers 665, 666 are provided with windows 665a, 666a which register with windows 641a in the flange 641 and receive the coil springs (energy storing elements) 648 of the inner damper 14. The coil springs 648 serve to yieldably oppose angular movements of the flange 641 and washers 665, 666 relative to each other. The flange 641 is further provided with radially outwardly extending arms 644 which alternate with the coil springs 645 of the outer damper 13, i.e., the arms 644 extend into the compartment 651 of the chamber 630.

The apparatus 601 also comprises an antifriction ball bearing 16 which is installed between the flywheels 3 and 4 in the same way as described in connection with FIGS. 1 and 2. A sealing device 674 operates between the radially innermost portion of the part 632 and the adjacent portion of the washer 666. The parts 631 and 632 are formed with grooves which jointly define the compartment 651 as well as a second compartment for portions of the coil springs 648.

A friction generating device 690 is provided between the flywheels 3 and 4 adjacent the antifriction bearing 16. This device is also confined in the chamber 630 and surrounds the protuberance 620 of the flywheel 3 between the bearing 16 and washer 665 on the one hand and the radially extending portion 691 of the section or part 631 on the other hand. The friction generating device 690 comprises a prestressed energy storing element 692 which is composed of two neighboring diaphragm springs and operates between the inner race of the bearing 16 and a pressure-applying ring 693. A friction pad 694 in the form of a washer is disposed between the ring 693 and the radially innermost portion 691 of the part 631. The pad 694 can be made of synthetic plastic material and has radially outwardly extending projections or prongs 694a which alternate with spaces for the heads 667a of the aforementioned distancing elements or rivets 667. The spaces between the prongs 694a provide room for some angular movement of the pad 694 relative to the flywheel 4 and vice versa. Thus, the flywheel 4 can turn the pad 694 with reference to the adjacent flywheel 3 when the heads 667a of rivets 667 come into abutment with the prongs 694a at the one or the other end of the respective spaces between prongs 694a. It will be noted that, when the direction of angular movement of the flywheel 4 relative to the flywheel 3 or vice versa is reversed, the friction generating device 690 is ineffective during the initial stage of angular movement of the flywheel 3 or 4 in the opposite direction. The extent of that an4ular displacement of the flywheel 3 or 4 during which the friction generating device 690 is ineffective is determined by the diameters of the heads 667a of the rivets 667 and by the length of the spaces between neighboring prongs 694a (as seen in the circumferential direction of the flywheels 3 and 4). The play between the heads 667a of the rivets 667 and the prongs 694a of the friction pad 694 renders it possible to shift that portion of the total angular displacement of the flywheel 3 relative to the flywheel 4 and/or vice versa during which the friction generating device 690 is effective with reference to the angular positions in which the energy storing coil springs 645, 648 begin to store energy.

Confinement of the friction generating device 690 in the chamber 630 is desirable and advantageous because this ensures that the moment of friction which is generated by the device 690 is constant or practically constant during the entire useful life of the apparatus 601.

It is possible to dimension the prongs 694a of the friction pad 694 and/or the heads 667a of the rivets 667 in such a way that the pad 694 is compelled to share all angular movements of the flywheel 4, i.e., that the friction generating device 690 is effective during each and every stage of angular movement of the flywheel 3 relative to the flywheel 4 and/or vice versa. Alternatively, the friction pad 694 can be extended radially outwardly into the region of the coil springs 648 and can have one or more windows for a corresponding number of coil springs 648. This enables the coil spring or springs 648 in such window or windows to restore the angular position of the friction pad 694, either entirely or in part.

The radially outermost portions 631b, 632b of the parts 631, 632 are coupled to each other by a ring-shaped cage 633 which is or can be made of a metallic sheet material. The radially inwardly extending portions of the cage 633 flank the portions 631b, 632b of the parts 631 and 632 to thereby hold, such parts against axial movement away from each other. The means for holding the parts 631, 632 against rotation relative to each other comprises axially parallel pins 638, such as heavy type dowel pins, which are received in registering bores or holes of the portions 631b, 632b. Each pin 638 further extends into a registering bore or hole in the right-hand radially extending portion 633b of the cage 633. Thus, the pins 638 also serve to hold the cage 633 against angular movement relative to the parts 631, 632 of the flywheel 3; this is desirable because the cage 633 is provided with means (to be described hereinafter) which limits the extent of angular movability of the flywheels 3 and 4 relative to each other.

The radially inwardly extending portion 633b of the cage 633 is disposed between the flywheel 4 and the part 632 and its radially innermost part has profiled portions in the form of teeth 633c which cooperate with pin- or stud-shaped projections 658 on the flywheel 4 to determine the extent of angular movability of the flywheels 3 and 4 relative to each other. The projections 658 cannot move with reference to the flywheel 4 and the cage 633 and its teeth 633c cannot move relative to the flywheel 3 (because the pins 638 are anchored in the parts 631, 632 as well as in the portion 633b of the cage 633). The projections 658 (each of which can constitute a dowel pin) cooperate with the teeth 633c to determine the extent of angular movability of the flywheels 3, 4 relative to each other and they also serve as a means for centering the cover (not shown) of a friction clutch which can be mounted on the flange 4a of the flywheel 4 in the same way as described in connection with FIGS. 1 and 2. The left-hand end portions of the projections 658 extend into the radially outermost portion of the radially extending ventilating channel 668 between the flywheel 4 and the part 632. The channel 668 communicates with passages 669 which are provided in the flywheel 4 radially inwardly of the inner damper 14.

The friction generating device 690 (or an analogous friction generating device) and/or the cage 633 (or an analogous cage) with means (633c) for limiting the extent of angular movability of the flywheels 3 and 4 relative to each other can be employed with equal or similar advantage in apparatus wherein the dampers 13, 14 are connected in parallel rather than in series. For example, the friction generating device 690 and the cage 633 with its teeth 633c can be used in the apparatus 1 of FIGS. 1 and 2.

Figure 11:
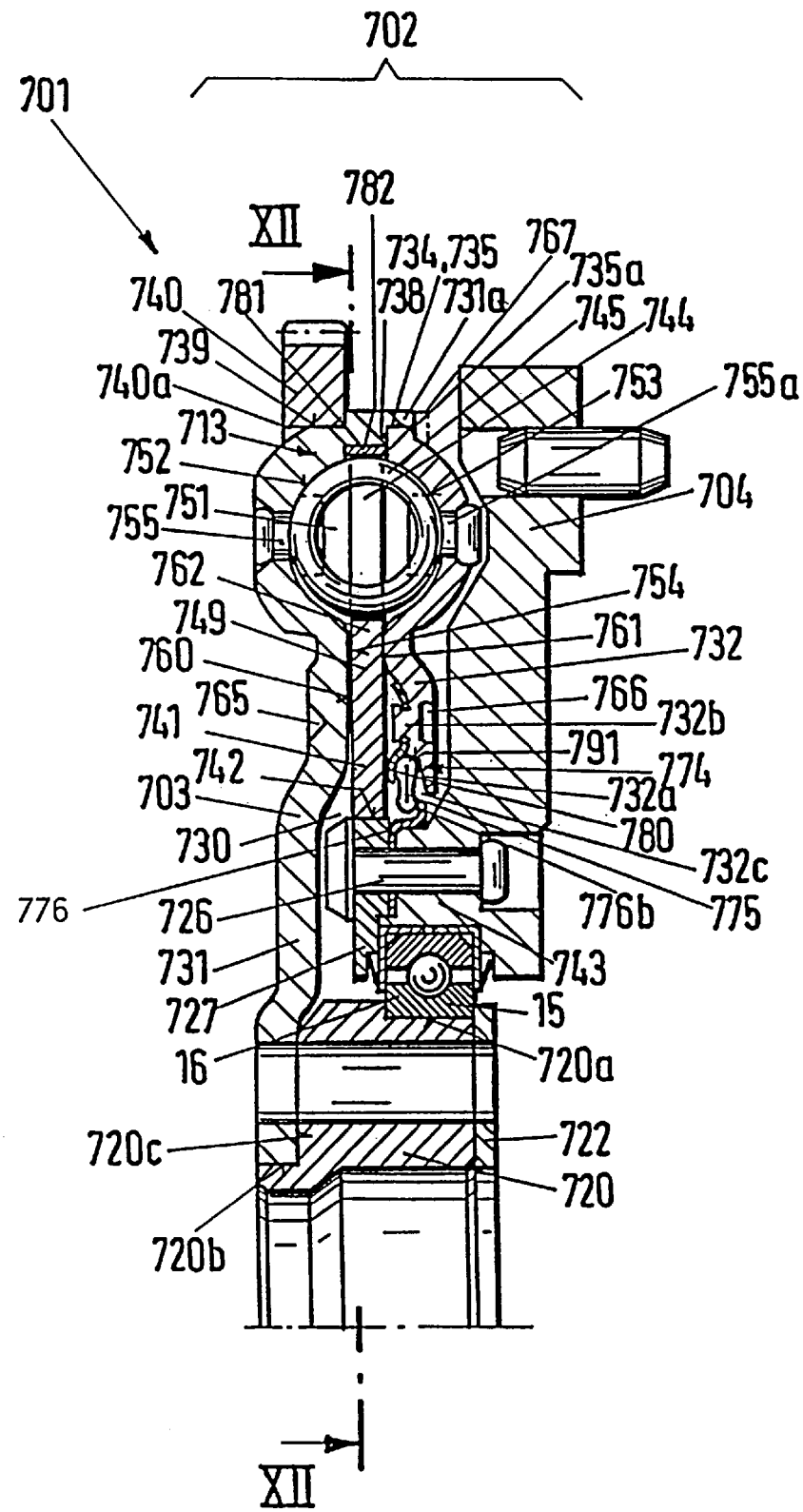
FIG. 11 is a fragmentary axial sectional view of an eighth apparatus with a single damper.
Figure 12:
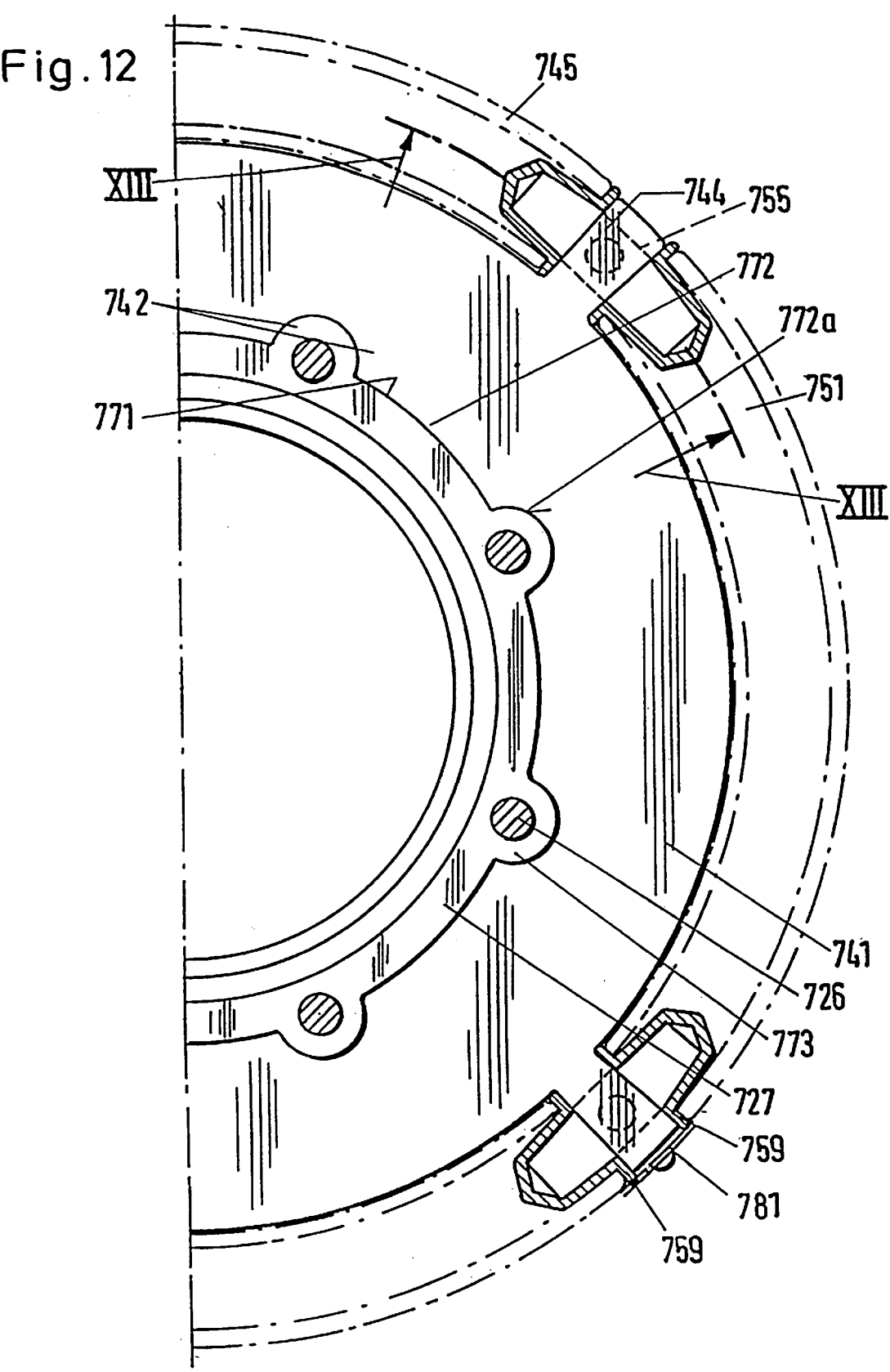
FIG. 12 is a fragmentary sectional view as seen in the direction of arrows from the line XII—XII of FIG. 11.

Referring to FIGS. 11 and 12, there is shown an apparatus 701 having a composite flywheel 702 with two components or flywheels 703 and 704. Antifriction bearing means 15 is interposed between the flywheels 703, 704 which can rotate relative to each other. The flywheel 703 includes a housing which defines an annular chamber 730 for a damper 713. The housing of the flywheel 703 includes two sections or parts 731, 732 having radially outermost portions which are outwardly adjacent the chamber 730 and are connected to each other. Each of the parts 731, 732 can be made of deformable metallic sheet material and their radially outermost portions can be bonded (e.g., welded) to each other, as at 738. The weld 738 simultaneously serves as a means for sealing the radially outermost portion of the chamber 730 from the surrounding atmosphere. The welding operation can be carried out in a resistance butt welding machine or in a so-called stored-energy high-rate discharge welding machine. In each of these machines, the welding operation is carried out by placing the parts to be welded against each other and by applying to them low-voltage high-amperage alternating current to heat the parts to welding temperature and to unite such parts in response to the application of pressure. In order to allow for the carrying out of such welding operation, the parts 731, 732 of the flywheel 703 are provided with surfaces 734, 735 which can be placed into abutment with each other and each of which has a predetermined area for the required current strength. The surfaces 734, 735 are welded to and abut each other in a plane which extends at right angles to the axis of the composite flywheel 702.

In order to properly center the part 732 relative to the part 731 in the course of the welding operation, the part 731 comprises a cylindrical portion 731a which surrounds the cylindrical peripheral surface 735a of the part 732. Accurate angular positioning of the parts 731, 732 relative to each other during welding of the surfaces 734, 735 to each other is ensured by welding pins (not shown) which project into axially parallel recesses or sockets 765, 766 of the parts 731, 732 in the course of the welding operation. This ensures that the parts 731, 732 are bonded to each other in optimum angular and radial positions.

The making of the weld 738 between the surfaces 734, 735 of parts 731, 732 involves a certain axial displacement of these parts relative to each other. Therefore it may be desirable or advantageous to provide the part 731 and/or 732 with one or more axially extending stops which become effective only in the course of the welding operation. FIG. 11 shows, by broken lines, a stop 767 which is provided on the part 732 of the flywheel 703. The provision of stops 767 renders it possible to make the quality of the welding operation less dependent upon the exact current strength, i.e., it is possible to operate with greater current strengths because the axial positions of parts 731, 732 with reference to each other are determined by the stops 767 rather than by the selected current strength and the axial pressure which is applied to the parts 731, 732 in the course of the welding operation.

The output element of the damper 713 is a radially disposed flange 741 which is installed between the parts 731, 732 of the flywheel 703. The connection 742 between the radially innermost portion of the flange 741 and a disc 727 at the end face of the axial protuberance or projection 743 of the flywheel 704 is of such nature that the flange 741 can move axially with reference to the disc 727 and vice versa. The means for securing the disc 727 to the projection 743 (which extends toward the part 731 of the flywheel 703) includes rivets 726 or analogous fastener means.

The flange 741 is formed with radially outwardly extending arms 744 which alternate with the energy storing coil springs 745 of the damper 713 and extend into the annular compartment 751 of the chamber 730. The compartment 751 constitutes the radially outermost portion of the chamber 730 and receives the coil springs 745. This compartment includes two annular grooves 752, 753 which are respectively provided in the radially extending surfaces of the parts or sections 731, 732 at the level of the damper 713. The making of grooves 752, 753 presents no problems since the parts 731, 732 consist of a deformable metallic sheet material. The central portions of the coil springs 745 (as seen in the axial direction of the apparatus 701) are located in the plane of the flange 741, and the outer portions of such springs extend into the respective grooves 752, 753. The flange 741 comprises an arcuate portion in the form of a rib 749 which is disposed radially inwardly of the compartment 751 and seals this compartment from the remainder of the chamber 730 save for the provision of a relatively narrow clearance or gap 754.

The configuration of surfaces bounding the grooves 752, 753 in the parts 731, 732 of the flywheel 703 is preferably such that their curvature conforms to that of the adjacent portions of coil springs 745 in the compartment 751. Thus, the radially outermost portions of the coil springs 745 could come into actual contact with the adjacent portions of the surfaces bounding the grooves 752, 753, at least when the apparatus 701 rotates so that the coil springs 745 are acted upon by centrifugal force.

In order to reduce or avoid wear upon the just discussed surfaces of the parts 731 and 732, the apparatus 701 can comprise a band- or strip-shaped member 781 which is recessed into the part 731 radially outwardly of the compartment 751 and is thus adjacent those portions of convolutions of the coil springs 745 which are most likely to rub against the flywheel 703 under the action of centrifugal force. The hardness of the material of the band-like member 781 can greatly exceed the hardness of the parts 731, 732. The illustrated member 781 is a short cylinder and is received in a recess 782 of the part 731. The recess 782 can be formed during casting of the part 731 or it can be machined into the part 731 in a grinding, milling or other suitable machine which employs material removing tools. The axial length of the member 781 suffices to ensure that it is contacted by the radially outermost portions of convolutions of the coil springs 745 when the apparatus 701 is in use, i.e., at least while the flywheels 703 and 704 rotate with and/or relative to each other.

Figure 13:
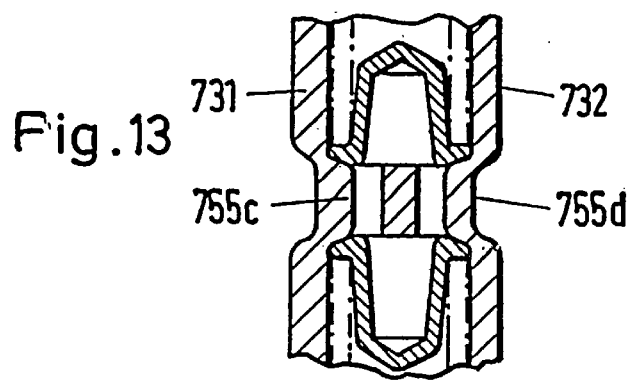
FIG. 13 is a fragmentary sectional view as seen in the direction of arrows from the line XIII—XIII of FIG. 12.

The parts 731, 732 respectively carry abutments or stops 755, 755a which extend into the respective grooves 752, 753 and cannot rotate relative to the flywheel 703. These abutments can be engaged by the end convolutions of the coil springs 745 in the compartment 751. Each arm 744 of the flange 741 is flanked by two abutments 755, 755a. In the embodiment which is shown in FIGS. 11 to 13, the length of the abutments 755, 755a in the circumferential direction of the compartment 751 equals or closely approximates the length of the respective arms 744. FIG. 12 shows cup-shaped retainers 759 which are disposed between the arms 744 and the adjacent end portions of the respective coil springs 745. The configuration of the retainers 759 is preferably such that they at least substantially fill the corresponding portions of the compartment 751 in order to offer a substantial resistance to the flow of a viscous fluid medium along their peripheral surfaces, i.e., between the retainers and the adjacent portions of surfaces bounding the grooves 752 and 753.

The compartment 751 is disposed radially outwardly of two annular portions 760, 761 of the radially extending surfaces of the parts 731, 732, and the portions 760, 761 define a ring-shaped passage 762 which is largely filled by the corresponding portion of the flange 741 so that the flange and the part 731 define the aforementioned narrow clearance or gap 754 providing a path for the flow of fluid medium between the compartment 751 and the radially inner portions of the chamber 730. The distance between the annular portions 760, 761 of radially extending surfaces of the parts 731, 732 need not appreciably exceed the thickness of the corresponding portion of the flange 741, i.e., the flange 741 and the part 731 can constitute a highly effective flow restrictor which offers a pronounced resistance to the flow of fluid medium into and from the compartment 751 of the chamber 730.

The compartment 751 accommodates four equidistant coil springs 745 each of which extends along an arc of or close to 82 degrees. Thus, the combined length of the four coil springs 745 in the circumferential direction approximates 90 percent of a complete circle. As already explained in connection with the coil springs 45 in the apparatus 1 of FIGS. 1 and 2, the coil springs 745 are preferably curved prior to insertion into the compartment 751 because this reduces the internal stresses which develop when the springs 745 are acted upon by the abutments 755, 755a and by the arms 744 in order to store energy. Furthermore, such shaping of the coil springs 745 facilitates their installation in the compartment 751. The initial curvature of the coil springs 745 can match or merely approximate the curvature of the compartment 751.

The supply of viscous fluid medium in the chamber 730 is preferably a lubricant, and its quantity is preferably selected in such a way that it fills at least the compartment 751 when the apparatus 701 is caused to rotate.

As can be seen in FIG. 12, the flange 741 has a central opening 771 bounded by a set of radially inwardly extending tooth-like projections 772 in mesh with complementary tooth-like projections 773 of the disc 727. The projections 772 and 773 together form the aforementioned connection 742. This connection ensures that the disc 727 and flange 741 can be readily separated from each other by moving the flange and/or the disc axially of the apparatus 701 as well as that, when the apparatus 701 is assembled, the flange 741 is compelled to share all angular movements of the flywheel 704 which carries the disc 727. The projections 773 fit into recesses or tooth spaces 772a which alternate with the projections 772 in the circumferential direction of the surface bounding the opening 771. The rivets 726 extend through the projections 773 of the disc 726 and are anchored in the flywheel 704. As described in connection with FIGS. 1 and 2, the projections 772, 773 render it possible to locate the flange 741 in an optimum position between the parts 731, 732 of the housing which defines the chamber 730; this, in turn, renders it possible to keep the width of the clearance or gap 754 between the flange 741 and the part 731 to a minimum. The connection 742 serves the additional useful purpose of allowing to compensate for machining tolerances of elements which include the flange 741 and the elements adjacent thereto.

The apparatus 701 further comprises a sealing device 774 which prevents or reduces to a minimum the escape of viscous fluid medium radially inwardly beyond the innermost portion of the chamber 730. This sealing device is installed between the. radially innermost portion of the part 732 and the flywheel 704. The main difference between the sealing device 774 and the sealing device 374 of FIG. 6 is that the entire sealing member 775 is coated with highly wear-resistant material. The radially outermost portion of the sealing member 775 is held against axial movement by the portion 732a of the part 732 and by a ring-shaped carrier 780 which latter is affixed to portion 732a of the part 732 by rivets 732b or similar fasteners.

The portion 732a of the part 732 extends radially inwardly beyond the radially outermost part of the axially resilient sealing member 775 so that the portion 732a and the member 775 define an annular space 732c having a wedge-like cross-sectional outline and an open innermost portion of maximum width which is located directly radially outwardly of the location of sealing engagement between the radially innermost portion of the member 775 and an insert 776. Such mounting of the sealing member 775 and such configuration of the part 732 ensure that minute quantities of viscous fluid medium which happen to escape from the chamber 730 in the region 776b between the sealing member 775 and insert 776 gather in the space 732c and are forced back into the chamber 730 under the action of centrifugal force when the apparatus 701 is set in rotary motion. As mentioned above, the region 776b of sealing engagement between the insert 776 and the sealing member 775 is located radially inwardly of the space 732c and at the same distance from the flange 741, as seen in the axial direction of the flywheels 703 and 704. This ensure that any fluid medium which has managed to pass between the insert 776 and the sealing member 775 invariably enters the space 732c under the action of centrifugal force when the flywheels 703, 704 are caused to rotate at an elevated speed.

The reference character 791 denotes in FIG. 11 a notch which is formed in the part 732 of the housing for the chamber 730 and serves to receive the radially outermost portion of the sealing member 775 and the carrier 780. The notch 791 extends in the axial direction of the flywheel 704 from the left-hand side of the part 732 and away from the flange 741.

The radially innermost portion of the part 731 is secured to an extension 720 which is a functional equivalent of the protuberance 20 on the flywheel 3 of FIG. 1 and is surrounded by the antifriction bearing 16 of the bearing means 15. The protuberance 720 has a cylindrical surface 720b which serves to center the part 731, and a circumferentially extending shoulder 720c which determines the axial position of the part 731. The manner in which the bearing 16 is installed between the flywheels 703 and 704 is or can be the same as described in connection with FIG. 1 or 6. The means for permanently or separably connecting the part 731 with the protuberance 720 can include a set of screws or rivets, a weld or an upset portion of the protuberance 720 at the left-hand side of the part 731 (as seen in FIG. 11).

The manner of assembling the flywheels 703, 704 of the apparatus 701 is analogous to the aforedescribed manner of assembling the flywheels 3 and 4 of FIGS. 1 and 2. Thus, the antifriction bearing 16 is first mounted in the flywheel 704 and the sealing device 774 is mounted on the flywheel 703. The bearing 16 is thereupon slipped onto the protuberance 720 of the flywheel 703 so that the inner race of the bearing surrounds the cylindrical peripheral surface 720a of the protuberance 720 whereby the projections 773 of the disc 727 on the flywheel 704 move into mesh with the projections 772 of the flange 741 to establish the connection 742. Moreover, the sealing member 775 of the device 774 is stressed in the axial direction as a result of engagement with the insert 776. The retaining ring 722 is then affixed to the end face of the protuberance 720 to locate the inner race of the bearing 16 in a desired axial position. This also ensures that the flywheels 703 and 704 are maintained in predetermined axial positions with reference to each other. The retaining ring 722 can be riveted, bolted, screwed or otherwise securely affixed to the protuberance 720 of the flywheel 703.

The manner in which the viscous fluid medium which partially fills the chamber 730 performs a desirable hydraulic or viscous damping action is the same as or similar to that described in connection with FIGS. 1 and 2. The damping action is attributable to the establishment of several flow restrictors as well as to turbulence in the fluid medium.

It is desirable to provide layers of electric insulating material between the parts affected by overheating or which are likely to overheat the neighboring elements are preferably phosphatized. The elements to be phosphatized preferably include the parts 731, 732 (which are made of metallic sheet material) and the flange 741. It is also possible to provide the parts 731, 732 and/or the elements or components which are in contact therewith with coats of suitable ceramic material, plastic material and/or grease. Such coats will normally be applied to the parts 731 and 732. It often suffices to phosphatize the parts 731, 732 and to merely apply layers of lacquer to the coil springs 745.

In order to simplify the phosphatizing or coating with a layer of ceramic or like material, the corresponding elements or components (such as the parts 731, 732) are preferably coated in their entirety and the thus applied coats are thereupon removed in the course of a secondary treatment in order to expose those portions which are to be welded to each other as well as those portions which are to be connected with the source of electrical energy. The secondary treatment can involve mechanical removal of ceramic material, phosphate or the like in a machine tool. This ensures that the parts 731, 732 are electrically conductive at 738 and at the location or locations of connection to the energy source. The selection of insulating material should be made with a view to ensure that the selected material is compatible with viscous fluid medium which is thereupon admitted into the chamber 730 to fill at least the compartment 751.

It is further preferred to select the insulating layer or layers (especially phosphatized coats) in such a way that they exhibit highly satisfactory wear resistant and self-lubricating properties.

The periphery of the part 731 defines a cylindrical seat 739 for the starter gear 740. The latter is preferably welded, as at 740a, to the part 731. The welded connection can be established all the way around the part 731 or it can consist of several spot welds. A connection which involves welding is preferred at this time in view of the limited thickness of the metallic sheet material which is used for the making of the part 731. As can be seen in FIG. 11, the axial length (thickness) of the gear 740 is greater than the thickness of the material of the part 731. FIG. 11 further shows that the thickness of the part 731 exceeds the thickness of the part 732.

Referring to FIG. 13, the abutments or stops 755, 755a of the apparatus of FIGS. 11 and 12 can be replaced with pocket-like abutments 755c, 755d which are integral portions of the respective parts 731 and 732. This simplifies the making and assembly of the respective apparatus because the number of separately produced parts is reduced and the abutments are invariably located in optimum. positions for engagement with the end portions of the adjacent coil springs. The recesses which are formed in the outer sides of the parts 731, 732 shown in FIG. 13 as a result of the making of pockets 755c, 755d can be used for reception of centering devices (not shown) which ensure that the parts 731, 732.are properly centered and otherwise positioned relative to each other in the course of the welding operation. The centering devices are normally provided in or on the welding apparatus which is used to connect the parts 731, 732 to each other, i.e., to form the welded connection 738 shown in FIG. 11. The dimensions of the centering devices are preferably selected with a view to ensure that such devices fill or practically fill the recesses at the outer sides of the pockets which constitute the abutments 755c and 755d of FIG. 13. Such centering devices can constitute electrodes which supply the welding current and/or the means for pressing the parts 731, 732 against each other in the course of the welding operation. It is particularly advantageous if the centering devices are constructed, configured and mounted in the welding apparatus in such a way that they are invariably located at a predetermined distance from each other (i.e., that the centering devices which enter the recesses outside of the pockets 755c and 755d are located at a preselected axial distance from one another); this ensures that the parts 731, 732 are located at an optimum axial distance from one another when the welding operation is completed. This is important in view of the aforediscussed need for proper dimensioning of the compartment 751 (to avoid excessive or insufficient rubbing contact between the surfaces surrounding the grooves 752, 753 on the one hand and the surfaces of convolutions of the coil springs 745 on the other hand). Moreover, proper positioning of the parts 731, 732 is important in view of the aforediscussed need to ensure that the elements defining the gap 754 will constitute effective flow restrictors by offering an optimum resistance to the flow of viscous fluid medium into and from the compartment 751.

Figure 14:
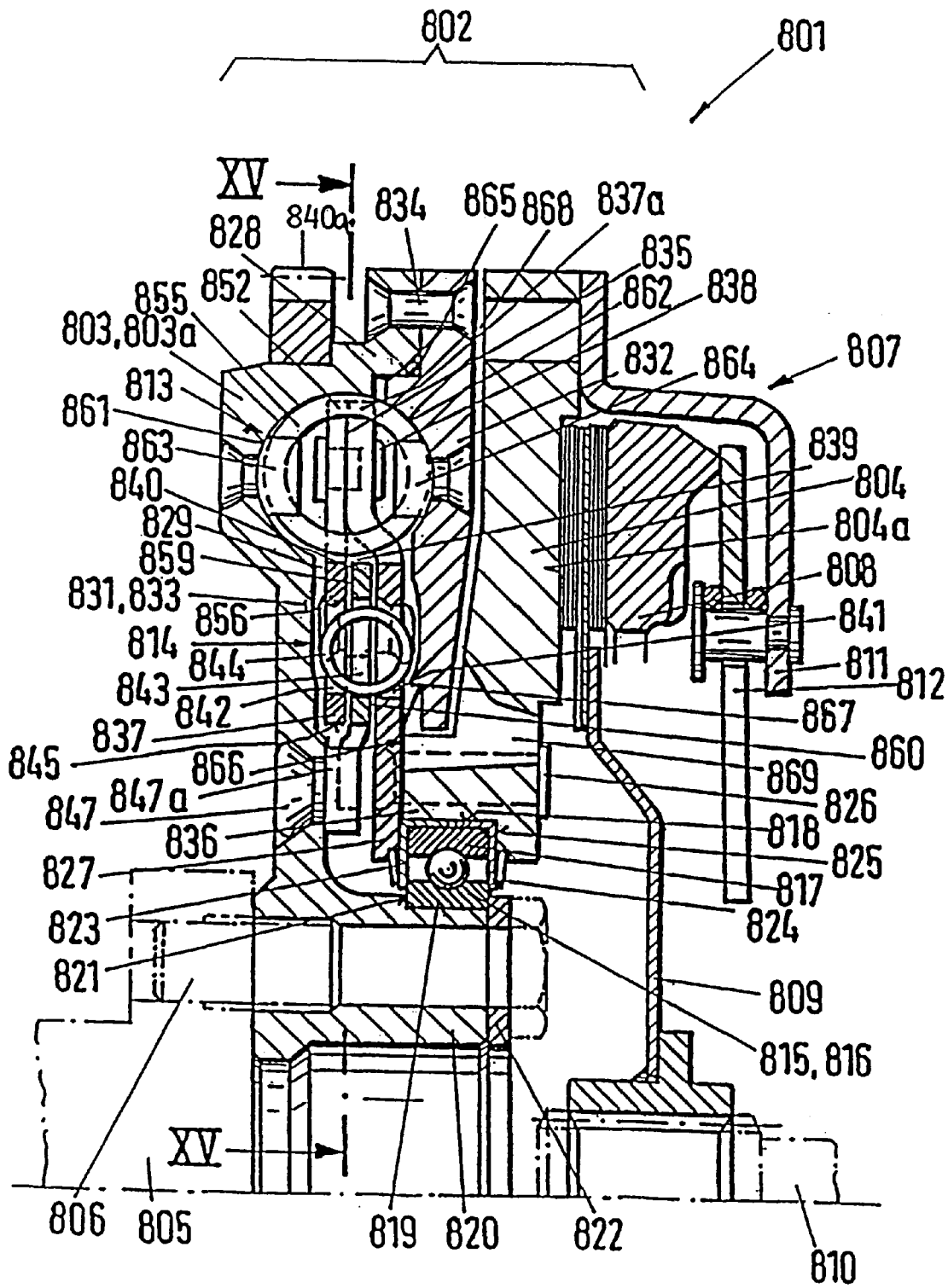
FIG. 14 is a fragmentary axial sectional view of a ninth apparatus.

The apparatus 801 of FIGS. 14 and 15 comprises a composite flywheel 802 which includes a first component or flywheel 803 secured to the output element 805 (e.g., a crankshaft) of the internal combustion engine by a set of bolts 806 or analogous fasteners, and a second component or flywheel 804 which can be connected with the input element 810 of a change-speed transmission in response to engagement of a friction clutch 807. The clutch 807 includes a cover 811 which is affixed to the flywheel 804, an axially movable pressure plate 808 between the cover 811 and the flywheel 804, a clutch plate or clutch disc 809 having a hub which is non-rotatably mounted on the input element 810 of the transmission and a set of friction linings which are disposed between the pressure plate 808 and the friction surface 804a of the flywheel 804, and a diaphragm spring 812 which is tiltable between two seats at the inner side of the cover 811 and biases the pressure plate 808 against the adjacent friction lining of the clutch plate 809 when the clutch 807 is engaged. The pressure plate 808 is axially movably but non-rotatably coupled to the cover 811 and/or to the flywheel 804. The means for engaging or disengaging the clutch 807 is of conventional design and is not shown in the drawing.

The damper means between the flywheels 803 and 804 includes a first or outer damper 813 and a second or inner damper 814. The dampers 813, 814 are connected in parallel and each thereof is designed to yieldably oppose rotation of the flywheels 803, 804 relative to each other.

The bearing means 815 between the flywheels 803, 804 comprises an antifriction ball bearing 816 with a single annulus of rolling elements between an inner race 819 and an outer race 817. The outer race 817 is installed in an axial recess 818 of the flywheel 804, and the inner race 819 surrounds a cylindrical portion of the peripheral surface of an axial protuberance 820 forming part of the flywheel 803. The protuberance 820 extends axially in a direction away from the output element 805 of the engine and is received in the recess 818 of the flywheel 804; this protuberance is integral with a radially outwardly extending flange 803a of the flywheel 803.

The inner race 819 is preferably a press fit on the protuberance 820 and abuts a circumferential shoulder 821 of the protuberance under the action of a washer-like retaining ring 822 which is secured to the protuberance by the heads of the aforementioned bolts 806. The bearing 816 is held against axial movement with reference to the flywheel 804 by being fixed between a disc 827 which is secured to the flywheel 804 by a set of distancing elements in the form of rivets 826 and by abutting an internal shoulder 825 in the recess 818. The outer race 817 of the bearing 816 is flanked by two rings 823, 824 each of which has an L-shaped cross-sectional outline and which constitute a thermal barrier between the friction clutch 807 and the bearing 816, and more particularly between the friction surface 804a and clutch plate 809 on the one hand and the races 817, 819 and rolling elements of the bearing 816 on the other hand.

The radially extending flange 803a of the flywheel 803 is integral with a cylindrical collar 828 which surrounds the radially outermost portion of an annular chamber 829. The collar 828 extends in the axial direction of the apparatus 801 and forms part of the housing for the chamber 829; such housing further includes two radially extending sections or parts 831, 832 which flank the dampers 813 and 814. The part 831 is an integral portion (833) of the radially extending flange 803a of the flywheel 803, i.e., of the element which is integral with and extends radially outwardly from the protuberance 820. The part 832 is a substantially or completely non-elastic rigid disc-shaped member which is disposed between the part 831 and the flywheel 804 and can be said to constitute a radially extending cover of the housing for the chamber 829. The radially outermost portion of the part 832 abuts the end face of the collar 828 and is secured to the latter by a set of rivets 834 or analogous fastener means.

The dampers 813, 814 comprise a common output element 835 which is non-rotatably connected to the flywheel 804. The output element 835 includes the aforementioned disc 827 which is affixed to the end face of a protuberance or projection 836 which surrounds the recess 818 and forms an integral part of the flywheel 804. The projection 836 extends axially toward the output element 805 of the engine. The output element 835 further includes a second disc 837 which is secured to the disc 827. FIG. 14 shows that the radially outermost portion of the disc 827 is dished or cupped in a direction toward the flange 803a of the flywheel 803 and that the disc 837 is affixed to the radially outermost (cupped or dished) portion 837a of the disc 827 by a set of rivets 838.

The dished or cupped configuration of the radially outermost portion of the disc 827 results in the formation of a recess or space 839 which is disposed between the discs 827, 837 and receives a disc-shaped member or flange 840 constituting the input element of the inner damper 814. The discs 827, 837 have registering openings or windows 841, 842 which register with windows 843 in the flange 840 and serve to receive energy storing elements in the form of coil springs 844 forming part of the inner damper 814. The length of the windows 841, 842 (as seen in the circumferential direction of the flywheels 803 and 804) equals or closely approximates the length of the windows 843, and each coil spring 844 is installed in the respective set of windows 841–843 in prestressed condition. This ensures that a certain moment can be transmitted between the input element or flange 840 of the inner damper 814 and the output element 835 of the outer damper 813 before the coil springs 844 undergo further compression.

The disc 837 (forming part of the output element 835), which is nearer to portion 833 of the flywheel 803 than the other disc 827, has an inner diameter (at 845) which exceeds the inner diameter of the disc 827. The latter cooperates with the shoulder 821 of the protuberance 820 to fix the bearing 816 in an optimum axial position. FIG. 15 shows that the radially innermost portion of the input element 840 of the damper 814 is provided with radially inwardly extending tooth-like projections 846 which mate with projections 847 on the portion 833 of flywheel 803. The projections 847 are rivets which are secured to the portion 833 of the flywheel 803 and each of which includes a portion (head) 847*a* extending axially beyond the general plane of the portion 833 and toward the flywheel 804 (see FIG. 14). The projections 846 cooperate with the projections 847 to limit the extent of angular movability of the input element 840 of the damper 814 with reference to the flywheel 803.

FIG. 15 further shows that the input element 840 of the inner damper 814 can turn relative to the flywheel 803 in the driving direction 848 (when the engine drives the input element 810 of the change-speed transmission) through a first angle 849 (before the heads 847*a* of the rivets 847 are engaged by the adjacent projections 846 of the input element 840) and that the input element 840 can turn with reference to the flywheel 803 through a second angle 851 in the opposite direction 850 (when the vehicle embodying the power train which employs the apparatus 801 is coasting). In the embodiment of FIGS. 14 and 15, the angle 849 equals or closely approximates the angle 851. However, it is also possible to select a non-symmetrical positioning of the rivets 847 with reference to the projections 846 of the input element 840 so that the angle 849 deviates from the angle 851. For example, the angle 849 could exceed the angle 851.

The cupped or dished radially outermost portion 837*a* of the disc 827 need not be a circumferentially complete member; as shown in FIG. 15, the portion 837*a* consists of several radially outwardly extending arms each of which has a bend at its radially innermost end. The disc 837 comprises radially outwardly extending prongs or lugs 852 each of which is adjacent an arm (837*a*) of the disc 827 and is secured thereto by a rivet 838. The length of the lugs 852 in the circumferential direction of the discs 827, 837 is the same as that of the arms 837*a*, and each arm 837*a* is in register with a lug 852. This renders it possible to use the coplanar edge faces of the lugs 852 and arms 837*a* as abutments or stops 853, 854 for the coil springs 855 of the outer damper 813.

The discs 827, 837 are further connected to each other by distancing elements in the form of rivets 856 which are disposed at the level of coil springs 844 in the inner damper 814, i.e., the annulus of rivets 856 has the same radius as the annulus of coil springs 844. Portions of the rivets 856 extend with play (as seen in the circumferential direction of the flywheels 803 and 804) through apertures or slots 857 of the disc-shaped input element 840. The dimensions of the slots 857 are selected in such a way that the coil springs 844 of the inner damper 814 are fully compressed (i.e., that each spring 844 acts not unlike a rigid block because its convolutions lie flush against each other) before the rivets 856 come into engagement with surfaces at the ends of the respective slots 857. Such dimensioning of the slots 857 is preferred at this time because it ensures that abrupt shocks which develop during transmission of torque between the flywheels 803 and 804 do not entail the development of pronounced impacts. This is due to the fact that, prior to undergoing total compression (to act not unlike solid blocks), the coil springs 844 exhibit a very pronounced progressivity of their characteristics. This takes place while the springs 844 are still capable of performing a certain axial movement as a result of radial shifting.

FIG. 15 shows that the rivets 856 are located radially inwardly of the arms 837*a* and lugs 852. The disc-shaped input element 840 has cutouts 858 which are located radially inwardly of the lugs 852, arms 837*a* and slots 857, and the cutouts 858 are flanked by the arms 846. The cutouts 858 are provided to facilitate deformation of the rivets 826 which are disposed at the same distance from the axis of the composite flywheel 802 and whose heads Are in register with the cutouts 858.

The input element 840 of the inner damper 814 is clamped axially between the discs 827, 837 which constitute the output element 835 of the outer damper 813. To this end, the input element 840 constitutes a diaphragm spring which is resilient in the axial direction and exhibits a certain amount of conicity prior to mounting between the discs 827, 837. When properly installed, the input element 840 is stressed axially so that a friction lining or pad 859 between the radially outermost portion of the element 840 and the disc 837 is compressed as well as that a friction lining or pad 860 between the radially innermost portion of the element 840 and the disc 827 is also kept in compressed condition. In order to facilitate assembly of the apparatus 801, the friction pads 859 and 860 are preferably bonded to the respective sides of the input element 840. The friction pad 859 is disposed radially outwardly and the friction pad 860 is located radially inwardly of coil springs 844 in the inner damper 814. When the input element 840 of the inner damper 814 turns relative to the output element 835 of the outer damper 813, the friction pads 859, 860 produce a frictional damping action which is effective in parallel to the bias of the coil springs 844.

The parts 831 and 832 of the housing for the chamber 829 are provided with arcuate grooves 861, 862 which together form the major part of a compartment for the coil springs 855 of the outer damper 813. These grooves receive (either entirely or in part) those portions of the coil springs 855 which extend beyond the respective sides of the output element 835. FIG. 14 shows that the curvature of the surfaces bounding the grooves 861, 862 equals or approximates the curvature of the coil springs 855, at least in those regions which receive the radially outermost portions of convolutions of the springs 855. This enables the convolutions of the, coil springs 855 to actually contact and be guided by the adjacent portions of surfaces bounding the grooves 861, 862, at least when the apparatus 801 is rotated and the coil springs 855 are acted upon by centrifugal force. It has been found that such configuration of the surfaces bounding the grooves 861, 862 entails a pronounced reduction of wear because wear between the convolutions of the coil springs 855 and the parts 831, 832 is not localized but takes place between relatively large portions of abutting surfaces on 831, 832 on the one hand and 855 on the other hand. Each of the grooves 861, 862 is a circumferentially complete recess in the respective part 831, 832. This is desirable and advantageous because the grooves 861, 862 can be formed during casting of the respective parts 831, 832 and the surfaces bounding such grooves can be thereupon treated to a desired degree of finish in a suitable machine using grinding, milling or other material removing tools.

The grooves 861, 862 respectively contain abutments or stops 863, 864 which engage the end convolutions of the adjacent coil springs 855. The length of the abutments 863, 864 in the circumferential direction of the flywheel 803 is the same as that of the arms 837*a* on the disc 827 and of the lugs 852 on the disc 837. Each of the abutments 863, 864 can constitute a separately produced element which fits rather snugly into the corresponding portion of the respective groove 861, 862 and is riveted or otherwise reliably secured to the respective part 831, 832. The end portions of the abutments 863 and 864 are preferably flattened to ensure the establishment of large-area contact with the end convolutions of the adjacent coil springs 855.

FIG. 15 shows that the outer damper 813 comprises three coil springs 855 each of which extends along an arc of approximately 110 degrees.

The relationship between the parameters of coil springs 844 and 855 is selected in such a way that, when the angular displacement of the flywheels 803, 804 reaches a maximum value, the final or maximum moment which is furnished by the outer coil springs 855 is less than the corresponding moment which is furnished by the inner coil springs 844. Furthermore, the spring rate of the inner springs 844 is greater than that of the outer springs 855.

The means for sealing the radially outermost portion of the chamber 829 for the dampers 813, 814 from the surrounding atmosphere comprises a sealing ring 865 which is mounted between the cylindrical collar 828 of the flywheel 803 and the part 832 radially inwardly of the rivets 834. The illustrated sealing ring 865 can constitute a simple O-ring.

A sealing device 866 is installed between the radially innermost portion of the part 832 and the axial projection 836 of the flywheel 804 to seal the radially innermost portion of the chamber 829 from the atmosphere. The sealing device 866 includes a ring-shaped member which has a disc-shaped inner portion clamped between the projection 836 of the flywheel 804 and the disc 827, and a frustoconical outer portion which acts not unlike a diaphragm spring and engages, in axially stressed condition, the adjacent portion of the part 832. Such frustoconical. outer portion of the sealing device 866 is received in a radially outwardly extending ring-shaped notch 867 of the part 832 at that side of this part which faces the disc 827. The surface bounding the notch 867 surrounds the sealing device 866 and extends along one side of the frustoconical outer portion of 866.

The chamber 829 contains a supply of viscous fluid medium which is preferably a lubricant. When the apparatus 801 is rotated, the fluid medium fills the outermost portion of the chamber 829 and preferably extends radially inwardly at least to the level of the axes of coil springs 855 forming part of the outer damper 813.

A radially extending ventilating or aerating channel 868 is provided between the part 832 and the flywheel 804 to ensure adequate cooling of the fluid medium in the chamber 829. The radially outermost portion of the channel 868 is open and the radially innermost portion of this channel communicates with substantially axially extending passages 869 which are provided in the flywheel 804 radially inwardly of the friction surface 804a.

The rivets 834 can be used as a means for locating the starter gear 840 in a predetermined axial position with reference to the flywheel 803.

The apparatus 801 operates as follows:

When one of the flywheels 803, 804 leaves the idle position of FIG. 15, e.g., in the coasting direction 850, the coil springs 855 of the outer damper 813 are caused to store energy. When the one flywheel (e.g., the flywheel 804) completes the angle 851, the radially inwardly extending projections 846 of the input element 840 of the inner damper 814 engage the respective abutments 847 of the flywheel 803 so that any further angular displacement of the flywheel 804 in the direction 850 then entails joint compression of coil springs 855 and 844. Such joint compression of coil springs 844 and 855 continues until the coil springs 844 begin to act not unlike solid blocks, i.e., when the convolutions of the coil springs 844 are immediately adjacent to and abut each other. This terminates the angular displacement of the flywheel 804 relative to the flywheel 803. In the embodiment of FIGS. 14 and 15, the angle 851 equals or approximates 32 degrees and the so-called blocking angle of the coil springs 844 is approximately 4 degrees so that the total angular displacement of the flywheel 804 relative to the flywheel 803 (and/or vice versa) can be in the range of 36 degrees. A frictional damping action takes place while the coil springs 844 store energy because the friction pads 859, 860 on the input element 840 respectively rub along the discs 827, 837. Additional frictional damping action is generated as a result of sliding contact between the convolutions of the coil springs 855 and the adjacent portions of surfaces bounding the grooves 861, 862 in the parts 831, 832. Moreover, the radially outermost portion of the sealing device 866 slides along the part 832 to generate additional frictional damping action. The fluid medium in the chamber 829 is agitated as well as displaced from the compartment for the coil springs 844, and this results in the development of hydraulic or viscous damping action in a manner and for reasons as explained above in connection with the apparatus 1 of FIGS. 1 and 2.

Figure 16:
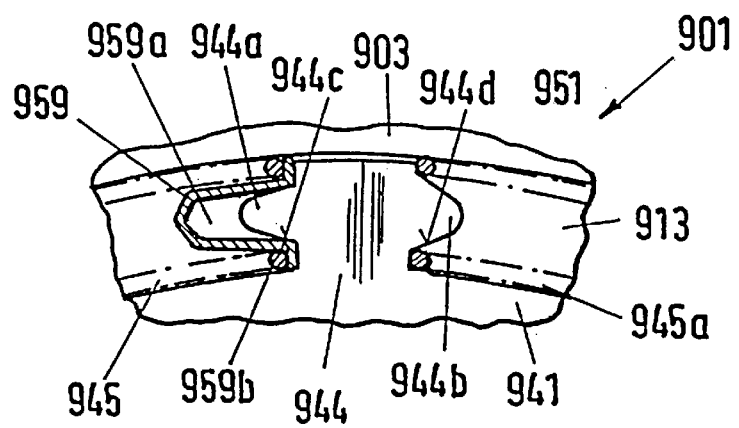
FIG. 16 is a fragmentary sectional view of a tenth apparatus with an abutment which can be used in the apparatus shown in other Figures.

FIG. 16 shows a portion of an apparatus 901 having a flange 941 which has radially outwardly extending abutments or arms 944 (one shown). These arms serve to compress energy storing elements in the form of coil springs 945, 945a of a damper 913 in a manner as described in connection with the apparatus shown in FIGS. 1 through 15. The coil springs 945, 945a are confined in an annular compartment 951 forming part of a chamber between the parts of the flywheel 903. The coil spring 945a is biased directly by the adjacent abutment or arm 944 and the coil spring 945a is acted upon by a cup-shaped retainer 959. Each arm 944 has two projections in the form of stubs or noses 944a, 944b which extend in opposite directions (i.e., away from each other) in the circumferential direction of the flywheel 903. The illustrated cup-shaped retainer 959 has a conical or spherical socket 959a in the form of a blind bore for the stub 944a of the arm 944. The configuration of the stub 944a is such that it can hold the retainer 959 and hence the adjacent hollow end portion of the coil spring 945 in a position such that the end portion of the coil spring is out of contact with the adjacent radially innermost or outermost portion of the compartment 951 at least when the spring 945 is caused to store energy. To this end, the stub 944a has a sloping ramp-like cam face 944c along which the adjacent portion 959b of the internal surface of the retainer 959 slides when the retainer approaches the main portion of the arm 944 whereby the inner part of the respective end portion of the coil spring 945 is lifted off or urged toward the adjacent surface bounding the compartment 951, i.e., such end portion of the coil spring 945 is moved radially outwardly or inwardly. The retainer 959 and its socket 959a have a circular cross-sectional outline.

The other stub 944b of the arm 944 which is shown in FIG. 16 has a cam face or ramp 944d which is adjacent the uppermost portion of the compartment 951 and cooperates with the end convolution of the coil spring 945a to urge such end convolution radially inwardly, i.e., toward the adjacent portion of the surface bounding the compartment 951.

If the apparatus 901 employs cup-shaped retainers 959, it is advisable to ensure that the outline of the stub 944a (or at least the outline of the ramp 944c) conforms to the outline of the adjacent portion 959b of the internal surface of the retainer 959; this ensures that the adjacent end convolutions of the coil spring 945 are pulled radially inwardly even if the angular position of the retainer 959 with reference to the arm 944 and its stub changes.

Projections corresponding to the stubs 944a, 944b shown in FIG. 16 can be used with equal or similar advantage in apparatus which are shown in FIGS. 1 to 15. Moreover, such projections or stubs can be provided on the aforediscussed abutments or stops in the compartments of chambers 30 . . . 829 of the previously described apparatus.

An advantage of the stubs 944a, 944b is that they can maintain the adjacent convolutions of the coil springs 945, 945a out of contact with the radially outermost portions of surfaces bounding the compartment 951 even if the flywheel 903 is rotated at a very high speed. Consequently, the axial length of the coil springs 945, 945a can be readily changed because they cause a minimum of frictional damping. An additional advantage of the stubs 944a, 944b is that they enable the adjacent end convolutions of the coil springs 945, 945a to move in the compartment 951 (i.e., to move toward or away from the arm 944) even if the frictional engagement between the median convolutions of such coil springs and the surfaces bounding the compartment 951 is very high, i.e., even if such median convolutions are prevented from sliding in the circumferential direction of the flywheel 903. This can take place when the rotational speed of the flywheel 903 is very high so that the median convolutions of the springs 945, 945a are acted upon by a very large centrifugal force. The freely slidable end convolutions of the coil springs 945, 945a are then still capable of damping high-frequency low-amplitude oscillations and similar stray movements of the flywheels.

The flange 941 is normally a flat stamping. The projections 944a, 944b of its arms 944 can receive a cylindrical, frustoconical or partly cylindrical or partly frustoconical shape as a result of secondary treatment in a suitable deforming machine. This enlarges the area of contact between the projections 944a and the internal surfaces of the respective cup-shaped retainers 959 on the one hand, and between the projections 944b and the hollow end portions of the respective coil springs 945a on the other hand. As mentioned above, the sockets 959a of the retainers 959 can have a conical, frustoconical or spherical outline.

The provision of projections 944a and/or 944b (i.e., of means for keeping at least the end portions of the coil springs 945 and/or 945a out of contact with the surfaces bounding the radially outermost portion of the compartment 951) is desirable and advantageous in many or most instances. However, certain apparatus are preferably designed in such a way that the movements of convolutions of the coil springs into frictional engagement with the adjacent outermost portions of surfaces bounding the compartment 951 (and/or the compartment for the coil springs of the inner damper) is promoted, at least when the flywheels rotate and the coil springs are acted upon by centrifugal force. This is desirable in apparatus wherein the coil springs begin to store energy only after a certain initial angular displacement of the flywheels relative to each other.

Figure 17:
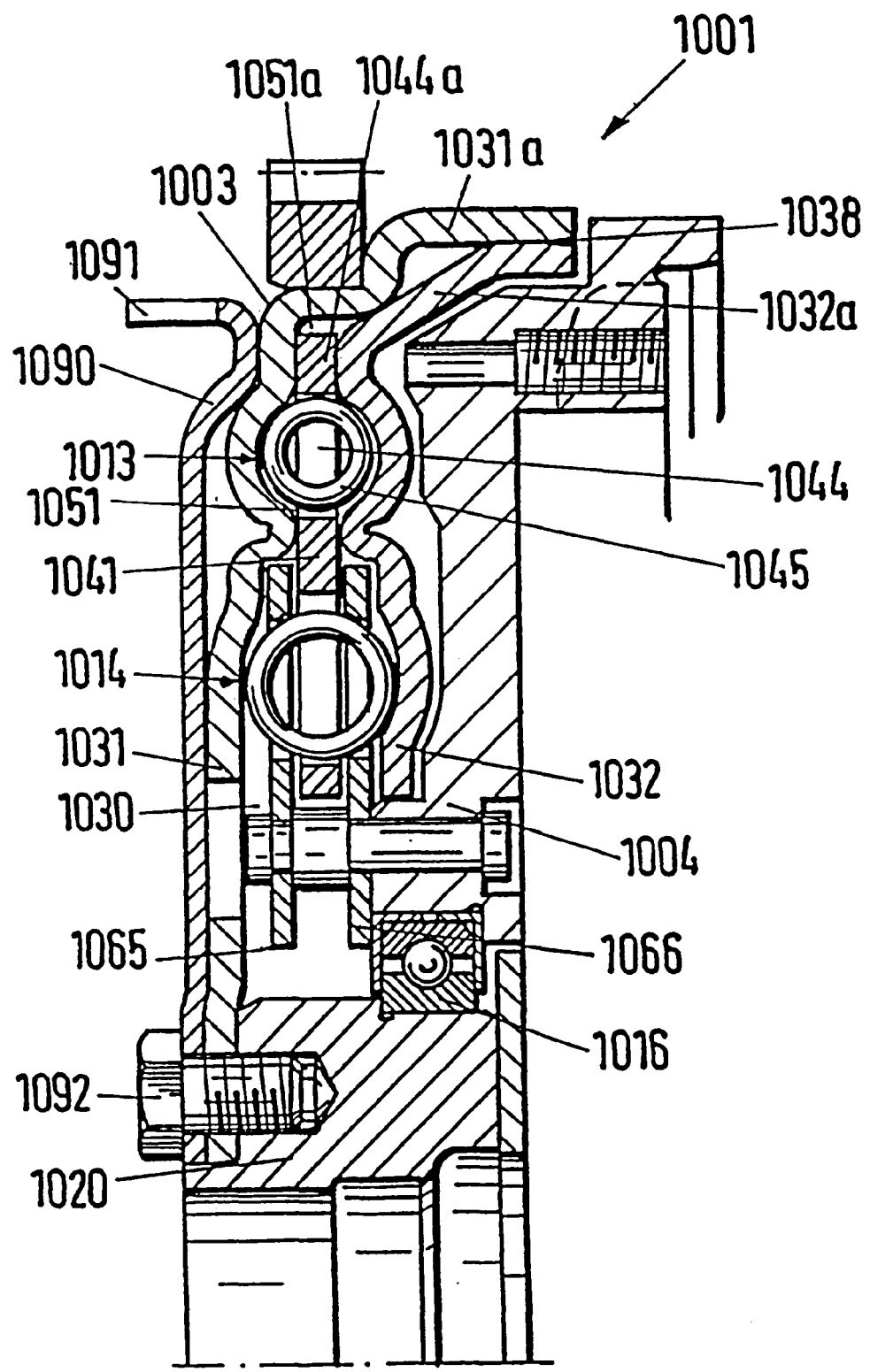
FIG. 17 is a fragmentary axial sectional view of an eleventh apparatus wherein the radially outermost portions of the housing sections are configured in a different way.

Referring to FIG. 17, there is shown a portion of an apparatus 1001 which has a composite flywheel including a first flywheel 1003 and a second flywheel 1004. The flywheel 1003 is connected to the output element of the engine (not shown), and the flywheel 1004 can be connected to a change-speed transmission by way of a friction clutch, not shown, in the same way as described in connection with FIGS. 1 and 2. The flywheel 1003 comprises two sections or parts 1031, 1032 which are made of deformable metallic sheet material and define an annular chamber 1030 for two series-connected dampers 1013, 1014. The coil springs of the dampers 1013, 1014 are coupled to each other by a flange 1041. The latter is flanked by two discs 1065, 1066 in a manner substantially as described in connection with FIG. 10.

The difference between the flange 1041 of FIG. 17 and the previously described similarly referenced flanges is that the radially outwardly located arms 1044 which extend into the compartment 1051 of the chamber 1030 have extensions 1044a which are disposed radially outwardly of the respective coil springs 1045 of the damper 1013. Thus, the radially outermost portions of convolutions of the coil springs 1045 can abut the inner sides of the adjacent extensions 1044a, at least when the flywheels 1003, 1004 rotate and the convolutions of the coil springs 1045 are acted upon by centrifugal force. It is rather simple to harden selected portions of or the entire flange 1041 so that it can stand extensive wear in spite of repeated and extensive frictional engagement with the coil springs 1045 of the damper 1013. For example, the extensions 1044a (and, if necessary, certain other portions) of the flange 1041 can be treated by induction hardening. Moreover, and if it is more convenient or less expensive, at least the extensions 1044a of the flange 1041 can be coated with layers of highly wear resistant material such as solid or hard nickel or the like.

The extensions 1044a of arms 1044 forming part of the flange 1041 are received in the radially outermost portion 1051a of the compartment 1051. The portion 1051a is also defined by the parts 1031, 1032 of the flywheel 1003; these parts include frictional engagement reducing inserts or portions 1031a, 1032a which extend radially outwardly beyond the outermost portion 1051a of the compartment 1051. The portions 1031a, 1032a also extend in the axial direction of the apparatus 1001 so that they form a sleeve or shell around the adjacent part of the radially outermost portion of the flywheel 1004. The portions 1031a, 1032a are welded to each other, as at 1038, preferably in the region of their rightmost ends as seen in FIG. 17. Such operation can be carried out in an electron beam welding machine. An advantage of the portions 1031a, 1032a is that they increase the moment of inertia of the flywheel 1003 without it being necessary to unduly enlarge the apparatus 1001 in the radial direction.

That side of the part 1031 of the flywheel 1003 which faces toward the engine is adjacent a disc 1090 which can be said to constitute a scale with graduations or other forms of indicia 1091 (e.g., projections, notches or the like) which are indicative of different parameters of the engine, for example, the timing of ignition and/or others. Reference may be had to commonly owned U.S. Pat. No. 4,493,409.

The flywheel 1003 further includes a centrally located axial protuberance 1020 which extends in a direction away from the output element of the engine and is secured to the scale 1090 and part 1031 by bolts, screws or other suitable fasteners 1092. The protuberance 1020 is surrounded by an antifriction ball bearing 1016 on which the flywheel 1004 can rotate relative to the flywheel 1003 and/or vice versa.

The utilization of aforediscussed radially outermost portions 1031a, 1032a is not limited to those apparatus wherein the parts of the housing for the annular chamber which confines the dampers are made of deformable metallic sheet material. It is also possible to rely on such mode of shaping the radially outermost portion of the flywheel which is attached to the output element of the engine in apparatus wherein the parts of the housing are castings.

The apparatus 1101 of FIG. 18 comprises a housing which defines an annular chamber (including an annular compartment 1151) and includes two parts or sections 1131a, 1132a which are made of deformable metallic sheet material. The compartment 1151 serves to receive energy storing coil springs 1145 forming part of a damper in the chamber. The parts 1131a, 1132a further define a radially extending ring-shaped passage 1162 which is located radially inwardly of and communicates with the compartment 1151 and is substantially filled by the respective portion of the flange 1141. Those portions (1165,1166) of the parts 1131a, 1132a which extend radially inwardly beyond the passage 1162 are connected with thicker parts. 1131, 1132 by means of rivets 1155, 1155a or the like. It can be said that each section of the housing for the chamber which includes the compartment 1151 includes two layers or strata including an outer layer 113, 1132 and an inner layer 1131a, 1132a.

The portions 1165, 1166 of the parts 1131a, 1132a can extend radially inwardly beyond the respective rivets 1155, 1155a to define a second annular compartment (not shown) for the coil springs of a second or inner damper corresponding to the damper 14 of the apparatus 1 shown in FIGS. 1 and 2. Alternatively, the portions 1165, 1166 need not extend radially inwardly well beyond the rivets 1155, 1155a; instead, such portions can define arcuate compartments for the coil springs of a second or inner damper between neighboring pairs of rivets 1155, 1155a as seen in the circumferential direction of the flywheel including the parts 1131, 1132, 1131a, 1132a.

The radially outermost portions of the parts 1131, 1132 are connected to each other radially outwardly of the compartment 1151 and of the parts 1131a, 1132a. The connection includes suitably bent prongs 1133 which constitute relatively thin extensions of the part 1132 and overlie radially outwardly extending lugs 1134 of the part 1131. The lugs 1134 can form a circumferentially complete rib or bead around the remaining portion of the part 1131. Pins 1138 are used to couple the extensions 1133 to the lugs 1134 so as to hold the parts 1131, 1132 against angular movement relative to each other.

The utilization of housings with inner and outer sections or parts corresponding to the parts 1131, 1131a and 1132, 1132a of FIG. 18 is not limited to the apparatus 1101 (wherein each of the parts 113, 1131a, 1132, 1132a is made of deformable metallic sheet material) but can be used with equal or similar advantage in apparatus wherein each part or section of the housing includes a casting. If one part is a casting, it is provided with a suitable recess which accommodates the inner part (corresponding to the part 1131a or 1132a). The arrangement may be such that the recesses of the castings accommodate at least those portions of the inner parts 1131a, 1132a which surround the energy storing elements of the respective damper or dampers.

Figure 19:
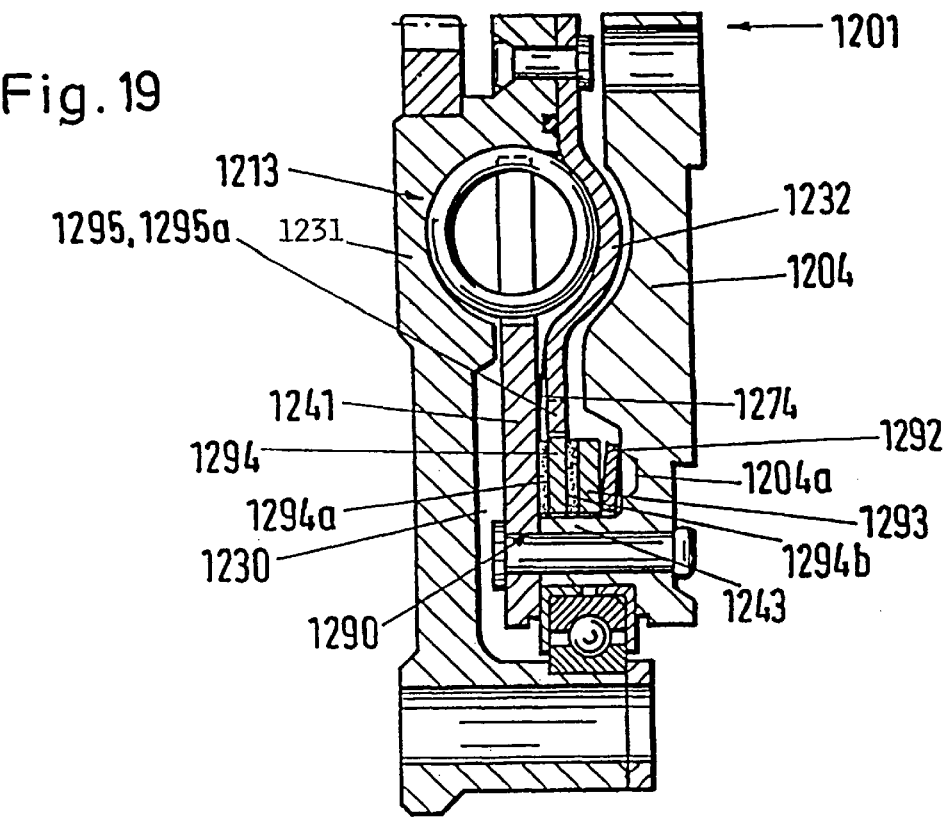
FIG. 19 is a fragmentary axial sectional view of a thirteenth apparatus wherein the damper means comprises a hydraulic damper and a dry friction generating device.

The apparatus 1201 of FIG. 19 has two flywheels one of which comprises a housing for an annular chamber 1230. The housing includes two parts 1231, 1232 which flank a flange 1241 extending in part into an annular compartment which forms the radially outermost portion of the chamber 1230 and receives the coil springs of a damper 1213. The chamber 1230 is at least partially filled with a viscous fluid medium, preferably a lubricant. The flange 1241 is fixedly secured to an axial protuberance or projection 1243 of the flywheel 1204 by a set of distancing elements in the form of rivets (only one shown). A sealing device 1274 is provided between the flange 1241 and the part 1232 of the housing for the chamber 1230.

The apparatus 1201 further comprises a dry friction generating device 1290 which is located radially inwardly of the part 1232 (i.e., outside of the chamber 1230) and is installed between the flange 1241 and the radially extending flange-like portion 1204a of the flywheel 1204. The friction generating device 1290 comprises a friction disc 1294 which is flanked by friction pads 1294a, 1294b. The pad 1294a is mounted between the friction disc 1294 and the flange 1241 and the pad 1249b is biased by a biasing device 1293 in the form of a washer which is acted upon by a diaphragm spring 1292. The spring 1292 is installed in prestressed condition between the radial portion 1204a of the flywheel 1204 and the biasing device 1293.

The friction disc 1294 is provided with radially outwardly extending arms 1295 which mate with radially inwardly extending projections or prongs 1295a of the part 1232. The arrangement is or can be such that the arms 1295 and the prongs 1295a mate without any play (as seen in the circumferential direction of the flywheels) or with a selected play, i.e., the friction disc 1294 and the part 1232 can have a certain freedom of angular movement relative to each other. Thus, the friction generating device 1290 can become effective only after at least one coil spring of the damper 1213 begins to store energy as a result of angular displacement of at least one flywheel relative to the other flywheel.

Figure 20:
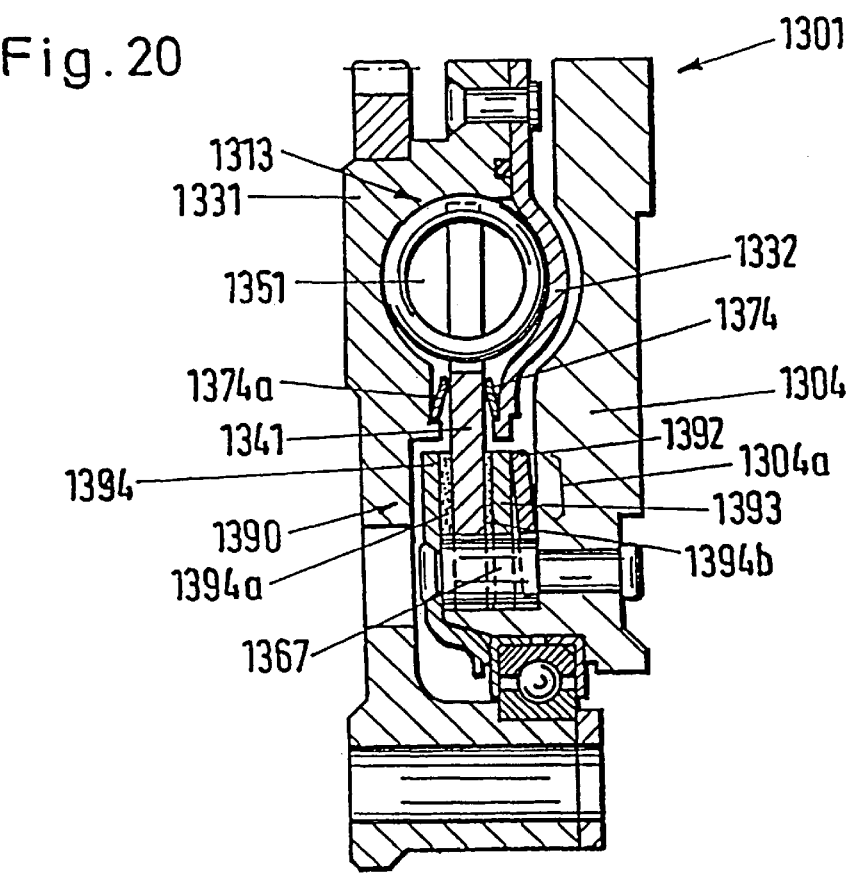
FIG. 20 is a fragmentary axial sectional view of-a fourteenth apparatus wherein the damper means comprises a hydraulic damper and a slip clutch.
Figure 22:
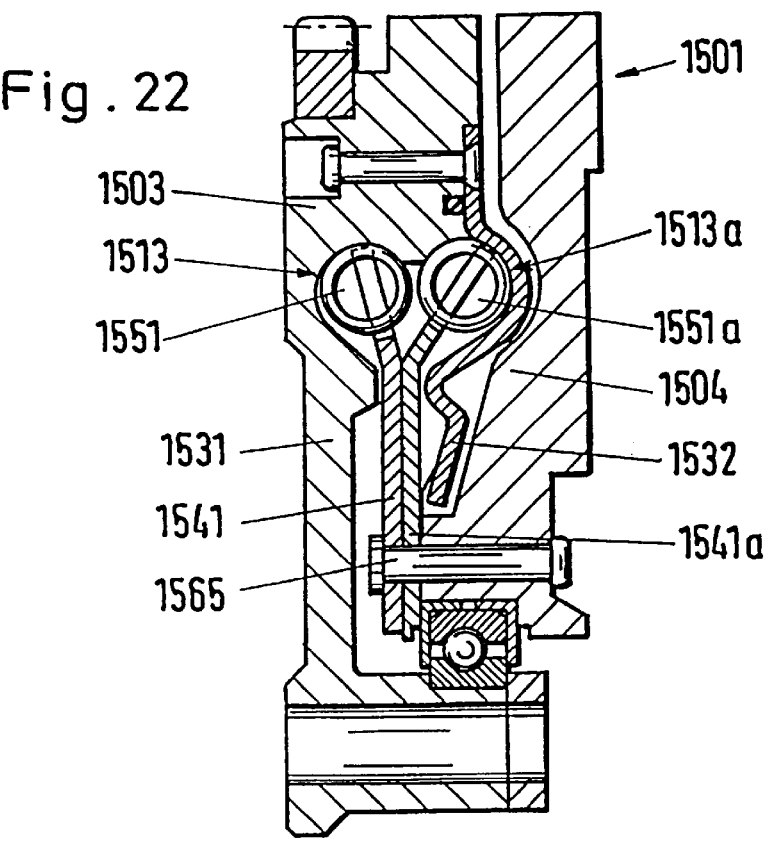
FIG. 22 is a fragmentary axial sectional view of a sixteenth apparatus wherein two dampers are disposed at the same distance from the axes of the flywheels.

The apparatus 1301 of FIG. 20 comprises a damper 1313 in a compartment 1351 which is outwardly adjacent two sealing devices 1374, 1374a cooperating with the adjacent portion of the flange 1341. The sealing device 1374 acts between the flange 1341 and the part 1332 of the housing for the annular chamber which includes the compartment 1351, and the sealing device 1374a acts between the flange 1341 and the part 1331.

That portion of the flange 1341 which is disposed radially inwardly of the sealing devices 1374, 1374a is flanked by and maintained in contact with two friction pads 1394a, 1394b which, in turn, are flanked by discs 1393, 1394. The disc 1394 is fixedly secured to the flywheel 1304 by distancing elements in the form of rivets 1367. The other disc 1393 is movable axially of the apparatus 1301 and is biased axially toward the friction pad 1394b by a diaphragm spring 1392 which reacts against the radially extending portion or flange 1304a of the flywheel 1304. The diaphragm spring 1392 and the disc 1393 have cutouts in the form of openings, slots or windows for the respective portions of the distancing elements 1367 so as to ensure that the spring 1392 and the disc 1393 are compelled to share the angular movements of the flywheel 1304.

The bias of the prestressed diaphragm spring 1392 determines the moment which is required to turn the flange 1341 relative to the flywheel 1304, i.e., the spring 1392 determines that force which is required to cause the flange 1341 to slip with reference to the flywheel 1304. It can be said that the radially innermost portions of the flange 1341 and the elements 1392 to 1394b jointly form a force-locking clutch or slip clutch 1390 in series with the damper 1313. The damping action of the clutch 1390 increases with increasing angular displacement of the flywheels relative to each other.

In order to limit the extent of angular movability of the flange 1341 relative to the flywheel 1304, the radially innermost portion of the flange 1341 can be provided with projections which alternate with the distancing elements 1367 (as seen in the circumferential direction of the flywheel 1304). Such projections then cooperate with the shanks of the distancing elements 1367 to determine the extent of angular movability of the flywheel 1304 and the flange 1341 relative to each other. The just discussed projections of the flange 1341 are optional, i.e., it is possible to mount the flange 1341 in such a way that, when a certain force is exerted, the flange has unlimited freedom of angular movement relative to the flywheel 1304. In such apparatus, the slip clutch 1390 is designed in such a way that the moment which can be transmitted thereby exceeds the nominal torque of the engine which drives the flywheel including the parts 1331, 1332.

In accordance with a modification which is not specifically shown in the drawing, the apparatus 1301 of FIG. 20 can be constructed in such a way that the flange 1341 is mounted with limited freedom of angular movement relative to the flywheel 1304 and the apparatus comprises a second damper having energy storing elements in the form of coil springs which are installed in windows provided therefor in the discs 1393, 1394 and flange 1341. The windows for such additional coil springs are provided in the discs 1393, 1394 and flange 1341 between neighboring distancing elements 1367 as seen in the circumferential direction of the flywheel 1304. It is then advisable to ensure that the spring rate of additional coil springs (which are installed in the region of the slip clutch 1390) be much higher than that of coil springs forming part of the damper 1313. Moreover, the frictional damping action which is generated by the slip clutch 1390 should be much more pronounced than the frictional damping action of the damper 1313 (while this damper is active) and which is produced, among others, by the sealing devices 1374, 1374a in cooperation with the flange 1341.

Figure 21:
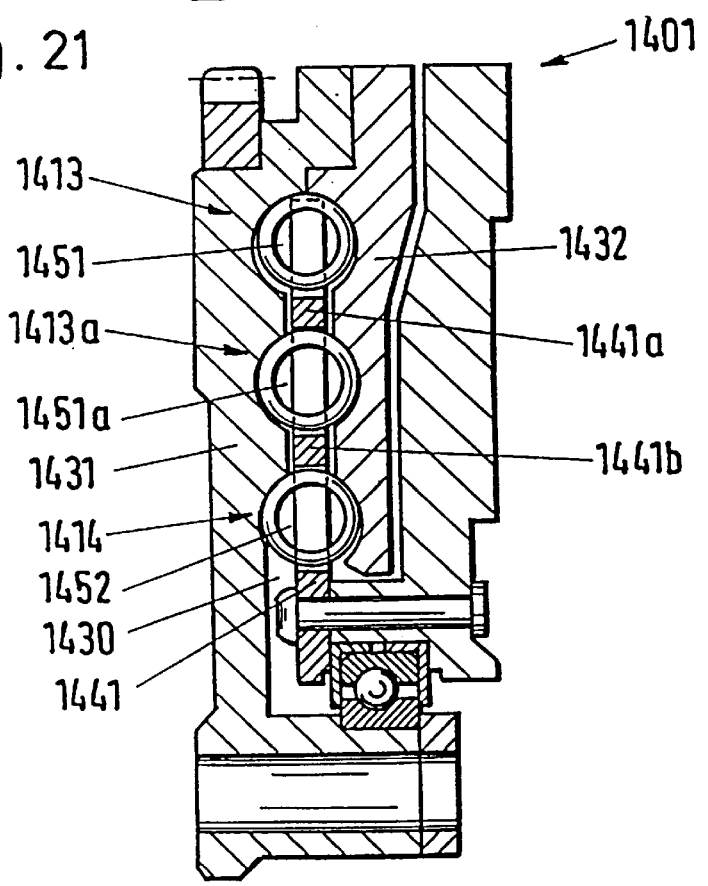
FIG. 21 is a fragmentary axial sectional view of a fifteenth apparatus with three concentric dampers disposed at different distances from the axes of the flywheels.

The apparatus 1401 of FIG. 21 comprises three dampers 1413, 1413a, 1414 which operate in parallel. The sections or parts 1431, 1432 of the housing for the annular chamber 1430 which accommodates the dampers define two annular compartments 1451, 1451a which respectively receive the coil springs of the dampers 1413 and 1413a. The coil springs of the dampers can be deformed by the prongs or arms of a flange 1441 which is installed between the parts 1431, 1431a.

The parts 1431, 1432 define a third annular compartment or space 1452 which receives the coil springs of the innermost damper 1414. To this end, the parts 14311 1432 have arcuate grooves at the respective sides of the flange 1441. The radially innermost portion of the compartment or space 1452 is substantially open. The quantity of viscous fluid medium in the chamber 1430 is selected in such a way that the fluid medium fills at least the outermost compartment 1451 but preferably the two outermost compartments 1451, 1451a.

The hydraulic or viscous damping action of the damper 1413 can deviate from the damping action of the damper 1413a. The damping action of each of the dampers 1413, 1413a can be varied in a number of ways, particularly by appropriate selection of the clearance or gap between the flange portion 1441a and the adjacent portions of the parts 1431, 1432 intermediate the compartments 1451, 1451a and/or of the clearance or gap between the flange portion 1441b and the parts 1431, 1432 radially inwardly of the compartment 1451a. Such regulation of the hydraulic damping action of the damper 1413 and/or 1413a can be relied upon in order to conform the apparatus 1401 for use in a particular power train. Furthermore, the hydraulic damping action can be varied in the previously described manner by appropriate selection of flow restrictors including cup-shaped retainers for coil springs in the compartment 1451 and/or 1451a. One or two cup-shaped retainers can be provided for one, two or more coil springs in the compartment 1451 and/or 1451a. The same applies for regulation of the damping action of the innermost damper 1414.

The apparatus 1401 can be modified by increasing the number of concentric dampers to four or even more. Furthermore, the dampers 1413, 1413a and 1414 can be connected in series rather than in parallel. It is also possible to provide a connection in parallel between two or these dampers and a series connection between another pair of these dampers.

FIG. 21 shows a portion of an apparatus 1501 wherein two dampers 1513, 1513a are disposed side by side, i.e., at the same or at nearly the same radial distance from the axes of the flywheels. The output elements of the dampers 1513, 1513a include two flanges 1541, 1541a having dished or cupped radially outermost portions in the respective compartments 1551, 1551a. The inner portions of the flanges 1441, 1441a are adjacent one another and are attached to the section or part 1532 of the housing for the chamber, which includes the compartments 1551, 1551a by, distancing elements in the form of rivets 1565. The sections or parts 1531, 1532 are elements of the flywheel 1503 which is affixed to the output element (not shown) of the internal combustion engine.

The radially innermost portions of the compartments 1551, 1551a are open; these compartments respectively receive the coil springs of the dampers 1513, 1513a. At least the major portions of surfaces bounding the compartments 1551, 1551a and provided on the parts 1531, 1532 of the housing for the annular chamber which includes these compartments are configurated in such a way that their curvature conforms to that of coil springs forming part of the respective dampers 1513, 1513a.

The coil springs of the dampers 1513, 1513a can be designed and mounted in such a way that they undergo compression one after the other, either individually or in groups of two or more. This renders it possible to impart to the damper means including the dampers 1513, 1513a a multistage characteristic curve. Furthermore, the arrangement may be such that the coil springs in one of the dampers (e.g., the coil springs of the damper 1513) become effective after the coil springs of the other damper have already undergone at least some compression, i.e., that one of the dampers is activated with a preselected delay following activation of the other damper in response to angular displacement of one flywheel relative to the other flywheel and/or vice versa.

The dampers 1513, 1513a can be connected in series and such dampers can be used in conjunction with one or more inner dampers (not shown). Still further, the apparatus 1501 can comprise three or more dampers at or close to the same distance from the axes of the flywheels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for damping vibrations, comprising at least two flywheel elements which are mounted for rotation relative to each other and include a first flywheel element connectable with a prime mover and a second flywheel element connectable with a transmission by way of a clutch; and damper means interposed between said flywheel elements and including at least two resilient dampers operating in parallel, one of said at least two resilient dampers being arranged to oppose, alone, a first stage of rotation of said first and second flywheel elements from a starting position and the other of said at least two resilient dampers being arranged to oppose, with said one resilient damper, a next-following second stage of rotation of said first and second flywheel elements relative to each other, said one resilient damper having a first stiffness and said other resilient damper having a second stiffness greater than said first stiffness, each of said resilient dampers including energy storing elements and said resilient dampers having a common output portion including two interconnected substantially washer-like members having openings for said energy storing elements, the energy storing elements of one of said resilient dampers being located nearer to a common axis of said flywheel elements and the energy storing elements of the other of said resilient dampers being more distant from said axis, said substantially washer-like members being spaced apart from each other in the direction of said axis at least at the openings for the energy storing elements located nearer to said axis.

2. The apparatus of claim 1, wherein said substantially washer-like members include abutting portions and said abutting portions have pockets for portions of the energy storing elements which are more distant from said axis.

3. The apparatus of claim 1, wherein said resilient damper having energy storing elements nearer to said axis further comprises an input portion located between said spaced-apart substantially washer-like members.

4. The apparatus of claim 1, wherein one of said substantially washer-like members is directly affixed to said other flywheel element and the other of said substantially washer-like members is affixed to said one substantially washer-like member, said substantially washer-like members having inner diameters and the inner diameter of said other substantially washer-like member being greater than the inner diameter of said one substantially washer-like member, said one substantially washer-like member being disposed between said other flywheel element and said one substantially washer-like member as seen in the direction of said axis.

5. Apparatus for damping vibrations, comprising at least two flywheel elements which are mounted for rotation relative to each other about a common axis and include a first flywheel element connectable with a prime mover and a second flywheel element connectable with a transmission by way of a clutch; and damper means interposed between said flywheel elements and including at least two resilient dampers operating in parallel, one of said at least two resilient dampers being arranged to oppose, alone, a first stage of rotation of said first and second flywheel elements from a starting position and the other of said at least two resilient dampers being arranged to oppose, with said one resilient damper, a next-following second stage of rotation of said first and second flywheel elements relative to each other, said one resilient damper having a first stiffness and said other resilient damper having a second stiffness greater than said first stiffness, one of said resilient dampers being nearer to and the other of said resilient dampers being more distant from said axis, said nearer resilient damper including an input portion and said resilient dampers having a common output portion comprising two interconnected substantially washer-like members including a first substantially washer-like member spaced apart from said other flywheel element and a second substantially washer-like member between said first substantially washer-like member and said other flywheel element, said input portion extending substantially radially inwardly toward said axis and beyond said first substantially washer-like member.

6. Apparatus for damping vibrations, comprising at least two flywheel elements which are mounted for rotation relative to each other and include a first flywheel element connectable with a prime mover and a second flywheel element connectable with a transmission by way of a clutch; and damper means interposed between said flywheel elements and including at least two resilient dampers operating in parallel, one of said at least two resilient dampers being arranged to oppose, alone, a first stage of rotation of said first and second flywheel elements relative to each other from a starting position and the other of said at least two resilient dampers being arranged to oppose, with said one resilient damper, a next-following second stage of rotation of said first and second flywheel elements relative to each other, said one resilient damper having a first stiffness and said other resilient damper having a second stiffness greater than said first stiffness, one of said flywheel elements including two walls extending substantially radially of a common axis of said flywheel elements and flanking an annular chamber receiving at least a portion of at least one of said resilient dampers, said portion of said at least one resilient damper including neighboring arcuate energy storing elements extending circumferentially of said one flywheel element and disposed in confronting circumferentially complete annular pockets provided in said walls, said at least one resilient damper further comprising abutments provided in said pockets between said energy storing elements, said abutments having plane surfaces abutting said energy storing elements.

7. Apparatus for damping vibrations, comprising at least two flywheel elements which are mounted for rotation relative to each other and include a first flywheel element connectable with a prime mover and a second flywheel element connectable with a transmission by way of a clutch; and damper means interposed between said flywheel elements and including at least two resilient dampers operating in parallel, one of said at least two resilient dampers being arranged to oppose, alone, a first stage of rotation of said first and second flywheel elements relative to each other from a starting position and the other of said at least two resilient dampers being arranged to oppose, with said one resilient damper, a next-following second stage of rotation of said first and second flywheel elements relative to each other, said one resilient damper having a first stiffness and said other resilient damper having a second stiffness greater than said first stiffness, one of said flywheel elements including two walls extending substantially radially of a common axis of said flywheel elements and flanking an annular chamber receiving at least a portion of at least one of said resilient dampers, said portion of said at least one resilient damper including neighboring arcuate energy storing elements extending circumferentially of said one flywheel element and disposed in confronting circumferentially complete annular pockets provided in said walls, said at least one resilient damper further comprising abutments provided in said pockets between said energy styoring elements, said abutments having flattened surfaces abutting said energy storing elements.

8. Apparatus for damping vibrations, comprising at least two flywheel elements which are mounted for rotation relative to each other and include a first flywheel element connectable with a prime mover and a second flywheel element connectable with a transmission by way of a clutch; and damper means interposed between said flywheel elements and including at least two resilient dampers operating in parallel, one of said at least two resilient dampers being arranged to oppose, alone, a first stage of rotation of said first and second flywheel elements relative to each other from a starting position and the other of said at least two resilient dampers being arranged to oppose, with said one resilient damper, a next-following second stage of rotation of said first and second flywheel elements relative to each other, said one resilient damper having a first stiffness and said other resilient damper having a second stiffness greater than said first stiffness, one of said resilient dampers being distant from and the other of said resilient dampers being nearer to a common axis of said flywheel elements, said resilient dampers comprising a common output portion including two substantially washer-like members and said nearer resilient damper including an input portion between said substantially washer-like members.

9. The apparatus of claim 8, further comprising friction generating insert means between said input portion and at least one of said substantially washer-like members.

10. The apparatus of claim 8, further comprising friction reducing insert means between said input portion and at least one of said substantially washer-like members.

* * * * *

UNITED STATES PATENT AND TRADEMARK OFFICE
CERTIFICATE OF CORRECTION

PATENT NO. : 6,196,925 B1  Page 1 of 1
DATED : March 6, 2001
INVENTOR(S) : Oswald Friedmann and Johann Jackel It is certified that error appears in the above-identified patent and that said Letters Patent is hereby corrected as shown below:

<u>Title page,</u>
Item [62], Related U.S. Application Data, change "08/320,732 October 19, 1994" to -- 08/320,732 October 7, 1994 --.

Signed and Sealed this

Twenty-ninth Day of January, 2002

*Attest:*

*Attesting Officer*

JAMES E. ROGAN
*Director of the United States Patent and Trademark Office*